(12) United States Patent
Mohammadi Darani et al.

(10) Patent No.: US 12,215,519 B2
(45) Date of Patent: Feb. 4, 2025

(54) STRUCTURAL CONNECTOR

(71) Applicants: AUT VENTURES LIMITED, Auckland (NZ); Farhad Mohammadi Darani, Auckland (NZ); Pouyan Zarnani, Auckland (NZ); Pierre Joseph Henri Quenneville, Auckland (NZ)

(72) Inventors: Farhad Mohammadi Darani, Auckland (NZ); Pouyan Zarnani, Auckland (NZ); Pierre Joseph Henri Quenneville, Auckland (NZ)

( * ) Notice: Subject to any disclaimer, the term of this patent is extended or adjusted under 35 U.S.C. 154(b) by 560 days.

(21) Appl. No.: 17/257,127

(22) PCT Filed: Jul. 5, 2019

(86) PCT No.: PCT/IB2019/055737
§ 371 (c)(1),
(2) Date: Dec. 30, 2020

(87) PCT Pub. No.: WO2020/008422
PCT Pub. Date: Jan. 9, 2020

(65) Prior Publication Data
US 2021/0123257 A1    Apr. 29, 2021

(30) Foreign Application Priority Data

Jul. 6, 2018 (NZ) .......................................... 744156
May 22, 2019 (AU) ................................. 2019901741

(51) Int. Cl.
*E04H 9/02* (2006.01)
*F16F 7/09* (2006.01)
*F16F 15/02* (2006.01)

(52) U.S. Cl.
CPC ........... *E04H 9/0215* (2020.05); *E04H 9/021* (2013.01); *E04H 9/0237* (2020.05); *F16F 7/095* (2013.01);
(Continued)

(58) Field of Classification Search
CPC .............................. F16F 7/095; F16F 2232/08
See application file for complete search history.

(56) References Cited

U.S. PATENT DOCUMENTS 2,705,634 A * 4/1955 Sampson .................. F16F 7/09
267/203
3,858,665 A * 1/1975 Winker .................... C09K 8/60
172/816
(Continued)

FOREIGN PATENT DOCUMENTS

CN    104482093 A    4/2015
CN    204372021 U    6/2015
(Continued)

OTHER PUBLICATIONS

English Machine Translation of JP2017078432 (Year: 2017).*
(Continued)

*Primary Examiner* — Melody M Burch
(74) *Attorney, Agent, or Firm* — Joseph G. Chu; JCIP

(57) ABSTRACT

A connector for connecting two structural components. The connector has a casing engaged and to move with a first of said structural components. The casing is of an elongate constant cross section interior within which is operative in a frictional sliding engagement a spring and damper assembly. This comprising of at least one damper to move with a second of said structural components and contacting the interior of the casing and able to slide in frictional contact with the casing. A spring is able to be elastically deformed by and between the damper and the casing when the damper (Continued)

and casing are in relative motion to bias the two structural components towards their initial relative position.

6 Claims, 17 Drawing Sheets

(52) U.S. Cl.
 CPC ......... *F16F 15/022* (2013.01); *F16F 2232/08* (2013.01)

(56) References Cited

U.S. PATENT DOCUMENTS

| | | | |
|---|---|---|---|
| 4,505,458 A | 3/1985 | Schultz | |
| 4,955,467 A | 9/1990 | Kallenbach | |
| 6,244,577 B1 | 6/2001 | Bucholtz | |
| 6,279,693 B1 | 8/2001 | Wiebe | |
| 7,861,833 B2 | 1/2011 | Park et al. | |
| 2005/0087414 A1 | 4/2005 | Okimura et al. | |
| 2012/0103452 A1* | 5/2012 | Toyohira | B60T 8/4081 138/31 |

FOREIGN PATENT DOCUMENTS

| | | | | |
|---|---|---|---|---|
| CN | 105604203 A | | 5/2016 | |
| CN | 107676414 A | * | 2/2018 | |
| DE | 102016219808 A1 | * | 4/2018 | ............. B60T 7/042 |
| EP | 1467115 A1 | | 10/2004 | |
| JP | S6073150 A | | 4/1985 | |
| JP | S6099377 U | | 7/1985 | |
| JP | H0942346 A | | 2/1997 | |
| JP | 2011202796 A | | 10/2011 | |
| JP | 2017078432 A | | 4/2017 | |
| JP | 2018096513 A | | 6/2018 | |

OTHER PUBLICATIONS

Extended European Search Report dated Mar. 31, 2022 for European Application No. 19831432.0.
International Search Report by Australian Patent Office completed on Jun. 19, 2019 for Provisional Patent Application No. 2019901741.
International Search Report and Written Opinion of International Searching Authority for International Application No. PCT/IB2019/055737.

* cited by examiner

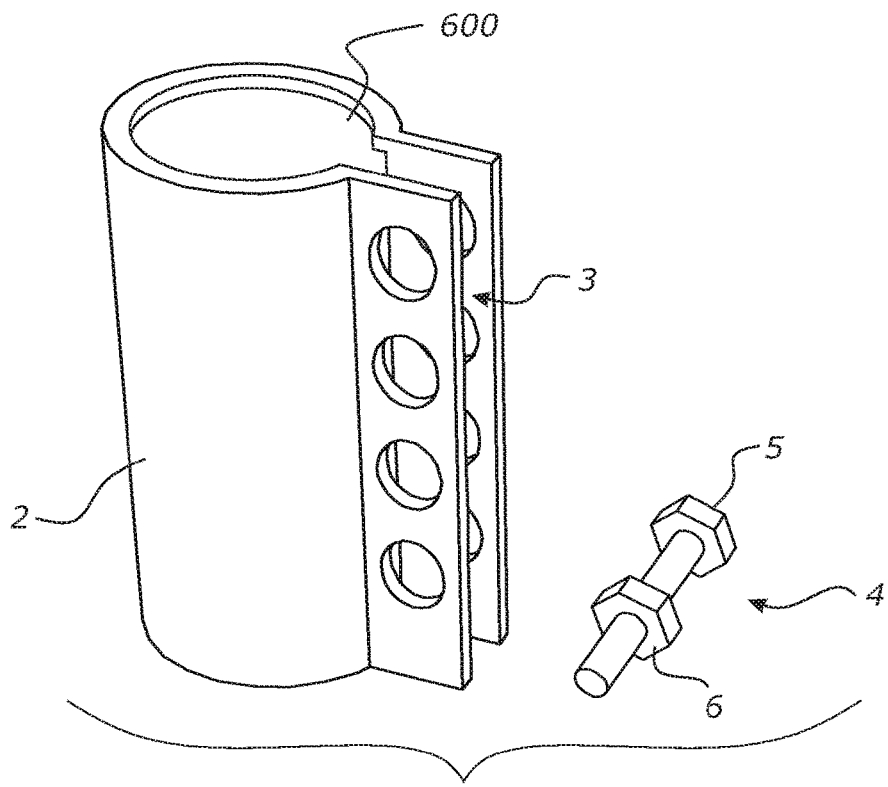
*FIG. 2A*
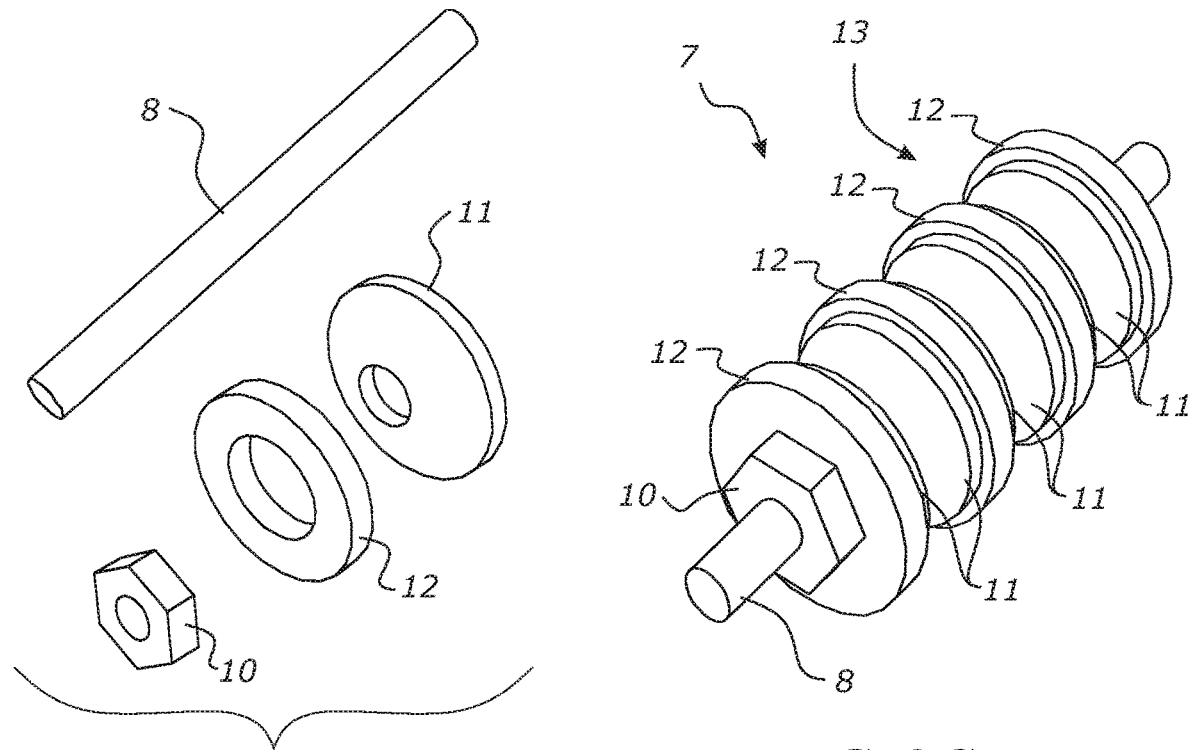
*FIG. 2B*  *FIG. 2C*

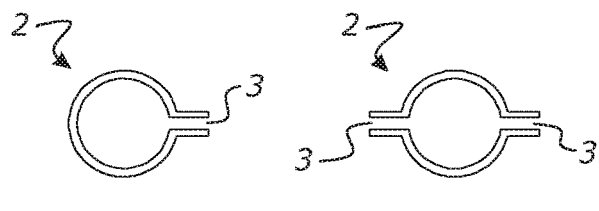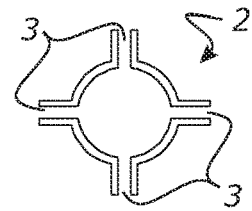
*FIG. 5A*  *FIG. 5B*  *FIG. 5C*
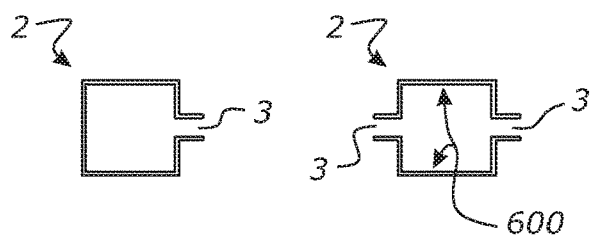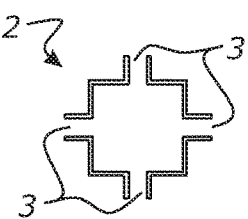
*FIG. 6A*  *FIG. 6B*  *FIG. 6C*
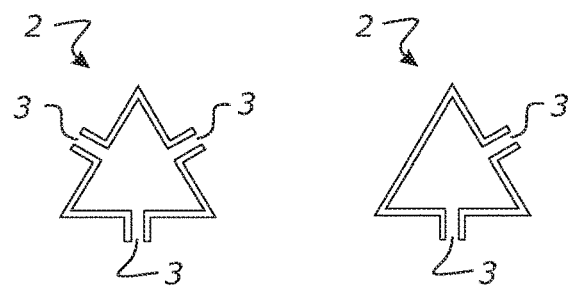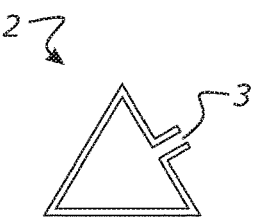
*FIG. 7A*  *FIG. 7B*  *FIG. 7C*
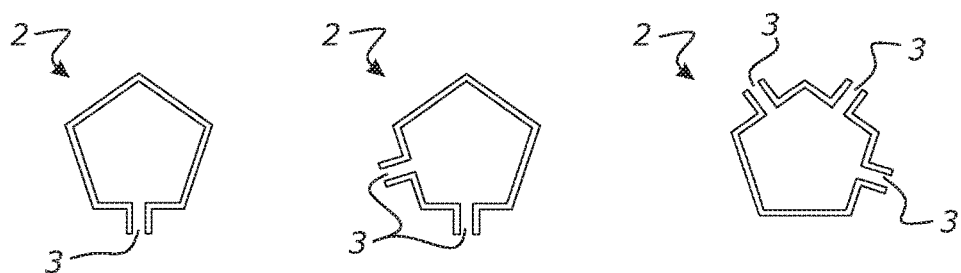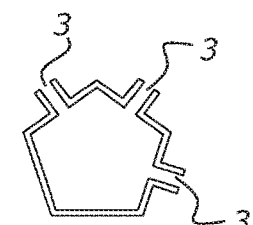
*FIG. 8A*  *FIG. 8B*  *FIG. 8C*
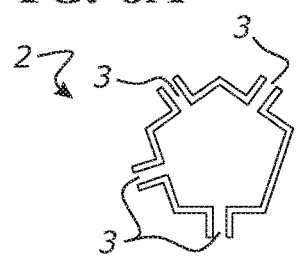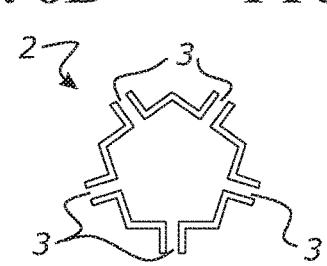
*FIG. 8D*  *FIG. 8E*

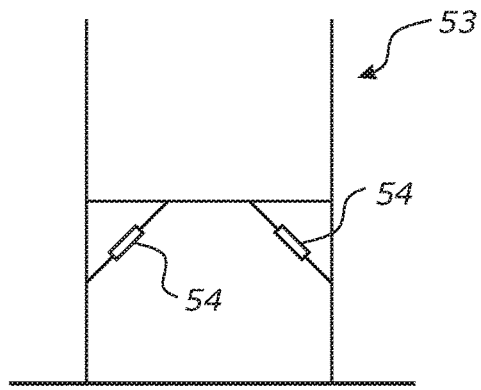
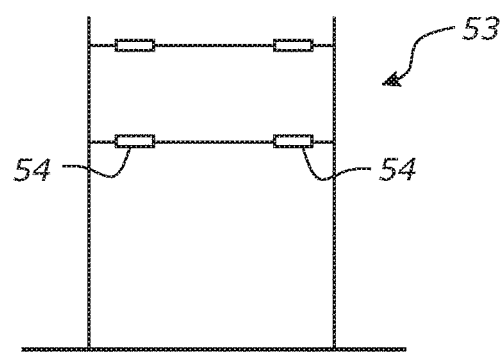
*FIG. 24A*  *FIG. 24B*
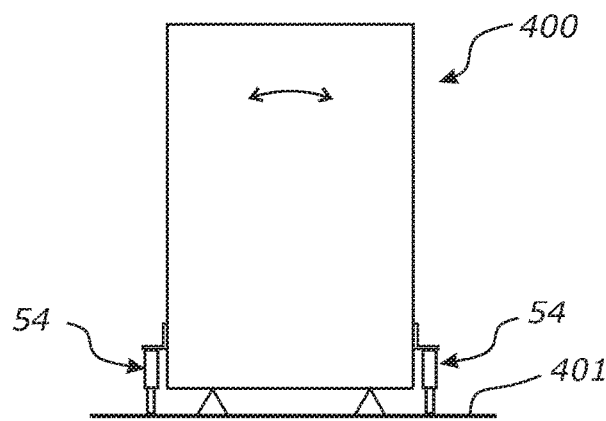
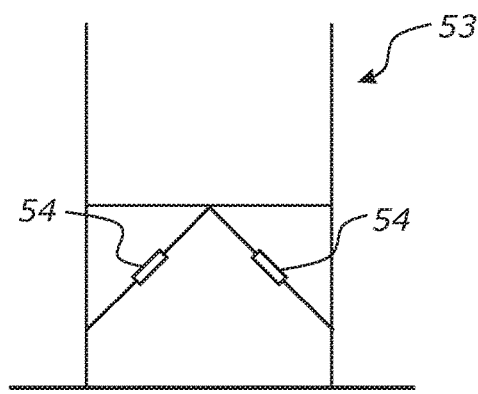
*FIG. 24C*  *FIG. 24D*

STRUCTURAL CONNECTOR

FIELD OF THE INVENTION

The present invention relates to a structural connector of or for a structure for resisting and damping external forces such as seismic and vibration forces, and to aid in the restoration of any residual displacement following an external forcing event.

BACKGROUND TO THE INVENTION

Structures such as buildings commonly experience external loadings such as seismic loadings or vibration loadings. These loadings may create forces between members of the structure. Structural connectors may be used to facilitate these connections, to hold the members of the structure together.

It may be desirable, rather than fixedly holding the members of the structure together, to allow some relative displacement between them when subjected to external forces.

Where relative displacement is allowed between members of a structure it may also be desirable to provide for damping, to absorb energy of the external forcing. Such damping may be provided by way of plastic deformation of structural connectors.

Such structural connectors commonly however require maintenance due to plastic deformation of their materials following an external loading. This maintenance may be costly, and may require significant interference with the structure itself because the structural connectors are commonly integrated with the structure.

Viscous dampers are also known. Dampers using a viscous material often use a piston and cylinder arrangement, the design of which can be difficult and time consuming as it is necessary to provide fluid tight seal to prevent leakage of the viscous material.

Friction dampers are also known and may for example be seen in EP1467115. These dampers rely on a frictional interface to absorb energy when the damper is set in motion due to an event such as an earthquake or other events.

The damper of EP1467115 when used in a building may not encourage a return of the building components that it is attached to, to their initial position pre-displacement. This means that a building that has been subject to an event is not encouraged to move back towards its initial condition and can mean that a building following a first event is more vulnerable to collapse or further damage in a subsequent event which may occur relatively shortly after the first event because the building is not in a more stable shape, being the shape that it was originally built in.

In this specification where reference has been made to patent specifications, other external documents, or other sources of information, this is generally for the purpose of providing a context for discussing the features of the invention. Unless specifically stated otherwise, reference to such external documents is not to be construed as an admission that such documents, or such sources of information, in any jurisdiction, are prior art, or form part of the common general knowledge in the art.

It is an object of the present invention to provide a structural connector which overcomes or at least partially ameliorates some of the abovementioned disadvantages or which at least provides the public with a useful choice.

SUMMARY OF THE INVENTION

In a first aspect, the present invention may be said to broadly consist in a double acting slip friction energy damping connector for use between a first structural member and a second structural member of a ground supported structure that may be subjected to induced motion that can cause the first and second structural member to relatively translate towards and away from each other from an initial static position facilitated by the connector that comprises:
  i. an elongate casing having a notional straight axis with an interior surface or surfaces, the casing connected to the second structural member to translate with the second structural member,
  ii. a spring and damper assembly to travel along the axis inside the casing and comprising of
    a. at least two spaced apart damper members each damper member having a friction surface or surfaces contacting the interior surface of surfaces of the casing to be able to slide with frictional resistance along the axis along at least part of the interior surface or surfaces,
    b. a pre-loaded spring arrangement intermediate of and forcing, when the first and second structural members are in their initial static position, the two adjacent damper members apart in the axial direction each against a respective bearing member of one of (1) the casing located at or towards each end of the casing, and (2) the second structural member, yet allowing the two damper members to move towards each other against the load of the spring by a connection rod that is connected to the first structural member and to translate with the first structural member, the connection rod having a stop positioned at each end of the spring and damper assembly,
      i. a first of said stops to act, when the connector acts in compression when the first and second structural members translate towards each other, on a first of said two damper members to displace the first of said two damper members away from its respective bearing member and towards the second of said two damper members and its respective bearing member, and
      ii. a second of said stops to act, when the connector acts in tension when the first and second structural members translate away from each other, on the second of said two damper members to displace the second of said two damper members away from its respective bearing member and towards the first of said two damper members and its respective bearing member.

Preferably at least one intermediate damper member is located between the first and second dampers, the spring arrangement comprising of at least two spring sets, a said set located between each adjacent damper members. Preferably the frictional engagement of each damper member with the casing is substantially the same and is preferably constant.

Preferably each damper member has a friction surface or surfaces shaped commensurate the interior surface of surfaces of the casing to be able to slide with frictional engagement along the interior surface or surfaces.

Preferably the contact of the friction surface or surfaces of each damper member with the interior surface or surfaces of the casing is such as to create a normal force on the damper member acting normal to the surfaces at their point of contact to establish said frictional resistance.

Preferably the normal force can be varied by changing the cross sectional shape of the casing.

Preferably the normal force is fixed and determined by the compression fit of the casing about the damper members.

Preferably the damper members and the casing are in a compression fit relationship with each other.

Preferably damper members have been assembled in said casing by compression fitting.

Preferably the intermediate damper members can translate along the axis relative the first and second structural members.

Preferably the first of said damper members in use remains fixed in translation relative said first structural member and said second of said damper members remains fixed in translation relative said second structural member.

Preferably the frictional engagement of the intermediate damper members with the casing is substantially the same and is preferably constant.

Preferably the frictional engagement of the intermediate damper members with the casing is substantially the same as the first mentioned damper members and is preferably constant.

Preferably the spring and damper assembly comprises of an array of damper members comprising the first and second of said damper members and at least one intermediate damper member each said damper member spaced apart from each other along the axis.

Preferably the connection rod passes through each damper member.

Preferably the connection rod can translate relative to each damper member along the axis.

Preferably the spring arrangement comprises of discrete spring sets that are each located intermediate of adjacent said damper members of the array of damper members of the spring and damper assembly.

Preferably as a force is applied to cause the first of said damper member to move away from its respective bearing member its initial displacement causes the adjacent spring set to compress more without displacing the adjacent intermediate damper member.

Preferably as the displacement of the first of said damper members increases beyond said initial displacement the compression force of the adjacent spring set increases to cause said adjacent intermediate damper member to displace, its initial displacement causes the next spring set in the array to compress.

Preferably each spring set is of the same spring constant.

Preferably the frictional resistance to sliding of each damping member relative the casing is the same.

Preferably the frictional resistance to sliding of the two damping members relative the casing is the different.

Preferably said damper members are able to slide along the axis in both directions relative to the interior surface of surfaces of the casing.

Preferably the elongate casing has an interior surface or surfaces defining a constant interior cross section for the or each damping member to slide along parallel the axis.

Preferably the elongate casing has an interior surface or surfaces of cylindrical cross section.

Preferably the elongate casing has an interior surface or surfaces between which the damper members can be captured to apply a compression loading onto the damper members to establish a friction force between the casing and the damper members.

Preferably the elongate casing has an interior surface or surfaces along which said damper members can slide that do not taper toward each other in the elongate direction.

Preferably the elongate casing has an interior surface or surfaces defining a polygonal cross sectional internal shape of the casing.

Preferably all the damper members are acted on by the spring arrangement.

Preferably all the damper members are acted on by the spring arrangement over the full range of travel of the spring and damper assembly in the casing.

Preferably the bearing members and the stops are able to act on the spring and damper assembly to cause it to be compressed.

Preferably there are at least two spaced apart damper members each damper member having a friction surface or surfaces contacting the interior surface of surfaces of the casing to be able to slide with constant frictional resistance parallel the axis along at least part of the interior surface or surfaces.

In a second aspect the present invention may be said to be a resilient slip friction connector for connecting to and allowing displacement between a first structural member and second structural member of a building structure and providing resistance to and damping of external forces that induce relative linear displacement between said first and second members and to provide a bias on the first and second structural members following external force caused relative linear displacement of the first and second structural members from an initial relative position to a displaced relative position, the bias being such as to return the first and second structural members towards their initial relative position from their displaced relative position, the connector comprising:

an elongate hollow casing, an elongate spring and damping assembly having two opposed ends and to slide inside the casing in frictional engagement with the casing and for connection to the first structural member to thereby be caused to slide inside the casing, and at least one bearing element for bearing against an end of the spring and damping assembly, wherein one of the at least one bearing element and the elongate hollow casing are for connection to said second structural member to move therewith, and wherein the spring and damping assembly is able to be elastically deformed by its compression between one of its ends and an at least one bearing element due to a relative linear displacement of the first and second structural members to their displaced relative position, and upon a sufficient reduction of an external force that caused the compression of the spring and damping assembly, the bias of the compressed spring and damping assembly exceeds the frictional force between the spring and damping assembly and the casing, and the first and second structural members are then caused to return under the bias of the compressed spring and damping assembly towards their initial relative position.

Preferably the casing comprising at least one elongate split allowing the casing to expand and contract its internal cross-sectional shape or area.

Preferably an adjustable member is provided for applying a force to the casing for setting and varying the sliding frictional engagement between the spring and damping assembly and the casing by virtue of the casing comprising said split.

Preferably a rod is provided within the casing for association with the elongate spring and damping assembly, and the rod is for connection to the first structural member.

Preferably the adjustable member acts at least in part as a bias towards a predetermined degree of frictional engagement between the casing and the elongate spring and damping assembly.

Preferably upon a ceasing of the external forcing the first and second structural members are caused to return under the bias of the spring and damping assembly to their initial position.

Preferably the reduction of the external forcing comprises a reduction below a first threshold.

Preferably upon the reduction of the external forcing below a second threshold, being a threshold lower than the first threshold, the first and second structural members are caused to return to their initial position.

Preferably the at least one bearing element is fixed relative the casing, and the casing is for connection to the second structural member.

Preferably the at least one bearing element is of the casing.

Preferably the casing comprises at least one bearing element only at or adjacent one end of the spring and damping assembly so as to provide for the elastic deformation of the spring and damping assembly only under relative displacement of the first and second structural members away from each other, being a utilisation of the connector in tension, or only under relative displacement of the first and second structural member towards each other, being a utilisation of the connector in compression.

Preferably under relative displacement of the first and second structural members wherein the connector does not provide for elastic deformation of the spring and damping assembly along the rod, the rod and casing are able to move freely relative each other.

Preferably under relative displacement of the first and second structural members where the connector does not provide for elastic deformation of the spring and damping assembly along the rod, the rod and casing are substantially prevented from relative displacement.

Preferably the casing comprises a bearing element and a stop of the rod at each end of the spring and damping assembly to provide for the elastic deformation of the spring and damping assembly under either of relative displacement of the first and second structural members away from each other, being a utilisation of the connector in tension, or under relative displacement of the first and second structural member towards each other, being a utilisation of the connector in compression.

Preferably the at least one bearing element is for connection to the first structural member and is associated with a sleeve provided about the casing, the sleeve being moveable relative the casing.

Preferably under a relative displacement of the first and second structural members the at least one bearing element of the sleeve and the stop of the rod act on opposing sides of the spring and damping assembly to elastically deform the spring and damping assembly.

Preferably the elastic deformation of the spring and damping assembly from both sides occurs substantially simultaneously.

Preferably the sleeve comprises at least one bearing element only at one end of the spring and damping assembly and one stop of the rod at the opposite end of the spring and damping assembly so as to provide for the elastic deformation of the spring and damping assembly only under relative displacement of the first and second structural members away from each other, being a utilisation of the connector in tension, or only under relative displacement of the first and second structural members towards each other, being a utilisation of the connector in compression.

Preferably under relative displacement of the first and second structural members wherein the connector does not provide for elastic deformation of the spring and damping assembly along the rod, the rod and sleeve are able to move freely relative each other.

Preferably under relative displacement of the first and second structural members where the connector does not provide for elastic deformation of the spring and damping assembly along the rod, the rod and casing are substantially prevented from relative displacement.

Preferably the sleeve comprises at least one bearing element and a stop of the rod at each end of the spring and damping assembly to provide for the elastic deformation of the spring and damping assembly under either of relative displacement of the first and second structural members away from each other, being a utilisation of the connector in tension, or under relative displacement of the first and second structural members towards each other, being a utilisation of the connector in compression.

Preferably the spring and damping assembly comprises at least one damping member for frictional engagement with the casing inside the casing and at least one spring member for providing the bias on the structural members.

Preferably the spring and damping assembly comprises a damping member at each end of the spring and damping assembly.

Preferably the damping assembly comprises a plurality of arrays of at least one damping member and at least one spring member.

Preferably the spring and damping assembly comprises a plurality damping members spaced apart by at least one spring member intermediate of the damping members.

Preferably the damping members substantially correspond with the unbiased cross-sectional shape or area of the casing.

Preferably the damping members comprise at least one coned-disc spring.

Preferably the at least one spring element is sized so as to also frictionally engage with the casing inside the casing.

Preferably the elastic deformation of the spring and damping assembly is provided by a compression of the at least one spring member, such as by an elastic bending.

Preferably the elastic deformation of the spring and damping assembly is provide by a stretching of the at least one spring member, such as by an elastic bending.

Preferably the spring and damping assembly comprises at least one combined spring and damping member.

Preferably each at least one combined spring and damping member is capable of both frictional engagement with the casing inside the casing and providing the bias on the members.

Preferably each at least one combined spring and damping member is sized so as to be capable of frictionally engaging with the casing inside the casing.

Preferably each at least one spring and damping member comprises a coned-disc spring.

Preferably each coned-disc spring under compression expands laterally to the direction of its compression, the lateral expansion of each coned-disc spring resulting in an increased degree of frictional engagement of the spring and damping assembly with the casing.

Preferably the elastic deformation of the spring and damping assembly is provided by a compression of the at least one spring and damping member, such as by an elastic bending.

Preferably the elastic deformation of the spring and damping assembly is provided by a stretching of the at least one spring and damping member, such as by an elastic bending.

Preferably the internal cross-sectional shape or area of the connector is substantially perpendicular to its elongate direction.

Preferably the at least one elongate split is partial or complete over the length of the casing.

Preferably the adjustable member of the casing is provided to act along the at least one elongate split.

Preferably the bias of the casing is towards a contracted cross-sectional shape or area of the casing.

Preferably the bias of the casing is provided by a clamping of the casing along the at least one elongate split plane.

Preferably the clamping of the casing comprises a clamping along at least a substantial portion of the at least one elongate split.

Preferably the bias is adjustable to provide a predetermined frictional engagement of the damping assembly and the casing.

Preferably the connector is a double acting slip friction earthquake energy damper connector.

Preferably the connector is for use between a first structural member and a second structural member of a ground supported structure that may be subjected to earthquake induced motion that can cause the first and second structural members to relatively translate towards and away from each other from an initial static position facilitated by the connector.

Preferably the elongate casing has a notional straight axis with an interior surface or surfaces defining one or more constant interior cross sections of the casing.

Preferably the casing is connected to the second structural member to translate with the second structural member.

Preferably the spring and damper assembly is to travel along the axis inside the casing.

Preferably the spring and damper assembly comprises at least two spaced apart damper members each damper member having a friction surface or surfaces commensurate the interior surface of surfaces of the casing to slide with frictional resistance along at least part of the interior surface of surfaces.

Preferably the spring and damper assembly comprises a pre-loaded spring arrangement intermediate of and forcing, when the first and second structural members are in their initial static position, the two adjacent damper members apart in the axial direction Preferably the forcing apart is to force each damper of the two damper members against a respective bearing member of the casing located at or towards each end of the casing, yet allowing the two damper members to move towards each other against the load of the spring by a connection rod that is connected to the first structural member and to translate with the first structural member.

Preferably the connection rod has a stop at each end of the spring and damper assembly, a first of said stops to act, when the connector acts in compression when the first and second structural members translate towards each other, on a first of said two damper members to displace the first of said two damper members away from its respective bearing member and towards the second of said two damper members and its respective bearing member and a second of said stops to act, when the connector acts in tension when the first and second structural members translate away from each other, on the second of said two damper members to displace the second of said two damper members away from its respective bearing member and towards the first of said two damper members and its respective bearing member.

Preferably at least one intermediate damper member is provided between the two first mentioned damper members the spring assembly comprising of spring sets each acting between each adjacent said damper members.

In a further aspect the present invention may broadly be said to be a method of manufacture of a connector as hereinbefore described, the method comprising the steps of
a) providing a predetermined desired restorative force capacity of the connector for a predetermined amount of elastic deformation of the spring and damping assembly,
b) providing a predetermined desired damping capacity of the connector,
c) determining a resultant required frictional force at each at least one damping member,
d) selecting the at least one spring member of the spring and damping member such that at the predetermined amount of elastic deformation of the spring and damping assembly the spring force is greater than the desired damping capacity, and
e) adjusting the bias of the casing or selecting an appropriate interference fit between the casing and the damping members so as to provide the predetermined desired damping capacity of the connector.

Preferably the predetermined desired restorative force capacity is dependent on at least the mass and configuration of the first and second structural members.

Preferably the predetermined restorative force capacity is dependent on at least the maximum allowable deflection of the structure at the first and second structural members between which the connector is to be connected.

Preferably when the damping and spring assembly comprises a damping member at each end of the spring and damping assembly the determination of the resultant required frictional force comprises dividing the predetermined desired damping capacity by the number of damping members minus one.

Preferably the casing and the spring and damper assembly have been assembled together in an interference-fit manner.

In a further aspect the present invention may broadly be said to be a connector for connecting two structural components together in an initial relative position, the connector comprising a casing, engaged and to move with a first of said structural components, comprising an elongate constant cross section interior within which is operative in a frictional sliding engagement a spring and damper assembly comprising of at least one damper engaged and to move with a second of said structural components and contacting the interior of the casing and able to slide in frictional contact with the casing in the elongate direction and a spring able to be elastically deformed by and between the damper and the casing when the damper and casing are in relative motion and to bias the relative position of the two structural components, during motion of the damper and casing, towards their initial relative position.

In a further aspect the present invention may be said to be a resilient slip friction connector for connecting and allowing displacement between a first structural member and second structural member of a structure and providing resistance to and damping of external forces that induce relative displacement between said two members and to provide a bias on the structural members following external force caused relative displacement of the structural members from an initial relative position to a displaced relative position, the bias being such as to return the structural members towards the initial relative position from their displaced position, the connector comprising an elongate hollow casing, the casing comprising at least one elongate split allowing the casing to expand and contract its internal cross-sectional shape or area, a elongate spring and damping assembly provided for sliding inside the casing in frictional engagement with the casing and for connection to the first structural member to displace therewith, and at least one bearing element for bearing against an end of the spring and damping assembly, an adjustable member for applying a force to the casing for setting and varying the sliding frictional engagement between the spring and damping assembly and the casing by virtue of the casing comprising said split, wherein one of the at least one bearing element and the elongate hollow casing are for connection to said the second structural member, and wherein the spring and damping assembly is able to be elastically deformed by compression between one of its ends and an at least one bearing element due to a relative displacement of the first and second structural members to their displaced relative position, and upon a sufficient reduction of an external force that caused the compression of the spring and damping assembly, the bias of the compressed spring and damping assembly exceeds the frictional force between the spring and damping assembly and the casing, and the first and second structural members are then caused to return under the bias of the compressed spring and damping assembly towards their initial relative position.

Preferably the interior surface of surfaces of the casing are of a circular cross section and the damper members are of a circular perimeter to allow the damper members to rotate in the casing.

Preferably the connection rod is coaxial the axis of the casing.

Preferably the connection rod is able to swivel relative the spring and damper assembly.

Preferably the connection rod is able to bend in force inducing event relative the spring and damper assembly.

Preferably the connection rod is held in a cantilevered manner by the first structural member.

In a further aspect the present invention broadly comprises a method of controlling the movement between a first structural member and a second structural member comprising connecting a connector as herein before described to said first and second structural members and adjusting the force applied by the casing to the spring and damping assembly to set a frictional resistance force of the connector for resisting movement between the first and second structural members.

In a further aspect the present invention may be said to be a slip friction earthquake energy damping connector for use between a first structural member and a second structural member of a ground supported structure that may be subjected to earthquake induced motion that can cause the first and second structural member to relatively translate towards and away from each other from an initial static position facilitated by the connector that comprises:

i. an elongate casing having a notional straight axis with an interior surface or surfaces, the casing connected to the second structural member to translate with the second structural member, ii. a spring and damper assembly to travel along the axis inside the casing and comprising of a. at least 3 spaced apart damper members each damper member having a friction surface or surfaces contacting the interior surface of surfaces of the casing to be able to slide parallel the axis with frictional resistance along at least part of the interior surface of surfaces, b. springs located intermediate of each adjacent said damper members to each bias the damper members apart in the axial direction at least when the first and second structural members are displaced from their initial static position (and preferably also when in the initial static position), as least one of said damper members able to press on and preferably against a bearing member of the casing or of the second structural member located at or towards an end of the casing, yet allowing the damper members to move towards each other against the bias of the springs by a connection rod that is connected to the first structural member and to translate with the first structural member, the connection rod having a stop located (preferably at the opposite end of the casing) at an end of the spring and damper assembly to be able to apply force to the spring and damper assembly towards the bearing member to increase the compression of the springs when then first and second structural members move from their initial static position.

Preferably the connector applies a force-displacement profile of the two structural members that is non-linear over the full range of travel of the spring and damper assembly in the casing when the two structural members translate relative each other in at least one direction from their initial static position.

Preferably the connector applies a force-displacement profile of the two structural members that is non-linear over the full range of travel of the spring and damper assembly in the casing when the two structural members translate relative each other in two directions from their initial static position.

In a further aspect the present invention broadly comprises a structure comprising at least two structural members connected using a connector as herein described.

As used herein the term "and/or" means "and" or "or", or both.

As used herein "(s)" following a noun means the plural and/or singular forms of the noun.

The term "comprising" as used in this specification means "consisting at least in part of". When interpreting each statement in this specification that includes the term "comprising", features other than that or those prefaced by the term may also be present. Related terms such as "comprise" and "comprises" are to be interpreted in the same manner.

This invention may also be said broadly to consist in the parts, elements and features referred to or indicated in the specification of the application, individually or collectively, and any or all combinations of any two or more said parts, elements or features, and where specific integers are mentioned herein which have known equivalents in the art to which this invention relates, such known equivalents are deemed to be incorporated herein as if individually set forth.

To those skilled in the art to which the invention relates, many changes in construction and widely differing embodiments and applications of the invention will suggest themselves without departing from the scope of the invention as defined in the appended claims. The disclosures and the descriptions herein are purely illustrative and are not intended to be in any sense limiting.

Other aspects of the invention may become apparent from the following description which is given by way of example only and with reference to the accompanying drawings.

BRIEF DESCRIPTION OF THE DRAWINGS

Preferred embodiments of the invention will be described by way of example only and with reference to the drawings, in which:

FIGS. 2A-2C show various components of the connector of FIG. 1A.

FIGS. 5A to 8E show various configurations of cross-sectional shape or area and elongate splits of a casing of a connector.

FIGS. 24A-D show potential applications of connectors according to the invention in various different structures.

DETAILED DESCRIPTION OF PREFERRED EMBODIMENTS

Figure 1A:
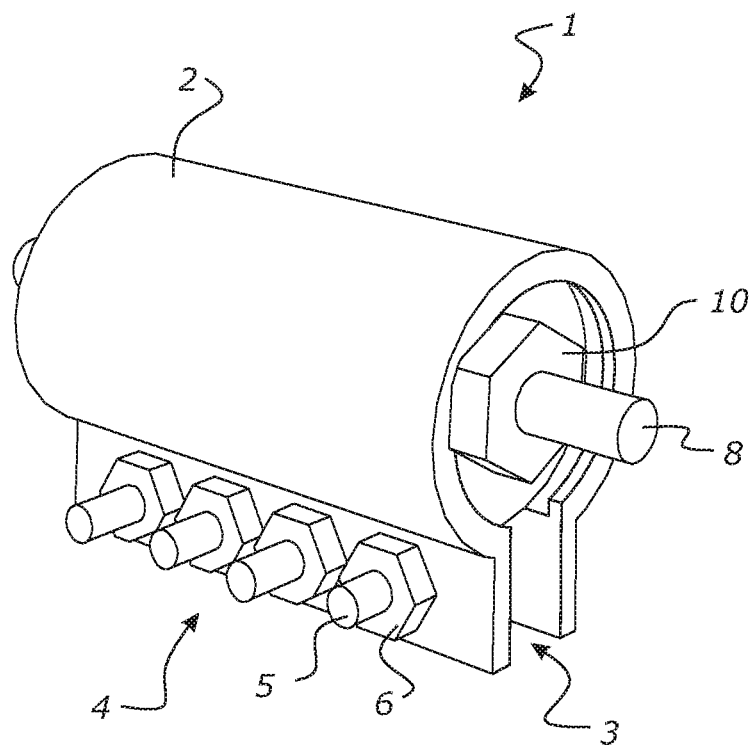
FIG. 1A shows an embodiment of a connector with a casing with a split.

The present invention relates to a structural connector for connecting between two structural members of a structure. The two structural members may herein be referred to as a first structural member and a second structural member. The structural members may be for example structural beams or columns of a building. One structural member may be a beam or column and the other may be a foundation or footing or pile as an example.

The connector is a resilient slip friction connector and may be single acting or double acting. It acts between two structural members or components that may be subjected to external forces that can push or pull the structural members or components to or away from each other in a translational manner.

Above a first predetermined threshold of external forces on the structural members, the connector may act to allow slip and hence relative displacement of the two structural members with which it is connected. The external force may arise from an external event such as an earthquake.

The connector can act to resist at least some relative displacement between the two structural members towards and/or away from each other when an external force is applied to the two structural members and may store energy, caused by relative displacement of the structural members to each other. During such relative displacement the connector may also provide damping to the displacement motion.

The connector may bias the two structural members to or towards a relative position of the two structural members relative to each other. Upon the ceasing or reduction below a second predetermined threshold of the external force the bias provided by the connector on the two structural members may act to return them from any relative displacement of the two structural members from an initial relative position, to or towards their initial relative positions. The initial relative position is preferably one established pre-event during construction or assembly of the connection with the two structural members. It is preferably one defined by a steady state of the structure. For a building or other civil engineered structure the steady state is likely to be initial static position of the structure, being preferably the state it is in when constructed. As such, the connector of the present invention may be described to exhibit positional restorative functions.

The connector of the present invention preferably comprises an elongate hollow casing. It has a notional axis that passes through the casing. The interior surface or surfaces of the casing are parallel the notional axis. The interior surface or surfaces define a substantially constant internal cross section of the casing.

The casing may be directly or indirectly connected to the second structural member to remain in a fixed relative position therewith.

The connector comprises an elongate spring and damping assembly. The spring and damping assembly, in use, is able to translate linearly within the elongate casing in a frictional engagement with the inside surface or surfaces of the casing in order to provide at least in part a damping function of the connector. The spring and damping assembly also acts in combination with other components of the connector to be able to provide a bias force on the two structural members to encourage them back toward on initial relative position if moved away from such.

The spring and damping assembly is preferably operatively connected to the first structural member to displace therewith. In the preferred form, the connection to the first structural member is by a connection at an end of the elongate spring and damping assembly.

In an alternative form, a rod may be located in the casing. Where provided, the rod is for connection to the first structural member and to remain in a fixed relative position therewith. About the rod is provided the elongate spring and damping assembly. To provide a limit of travel of the spring and damping assembly on the rod, the rod may comprise of a stop or stops.

In one preferred version of the connector the casing preferably comprises at least one split extending over its elongate length allowing the casing internal cross-sectional shape or area to be changed (e.g. by expansion or contraction) by active adjustment. This version is shown in most figures attached. The expansion and contraction may be an actual expansion or contraction, or a bias towards an expansion or contraction of cross-sectional area or shape. An alternative version of the casing is shown in FIG. 1B where the casing has no split.

Figure 1B:
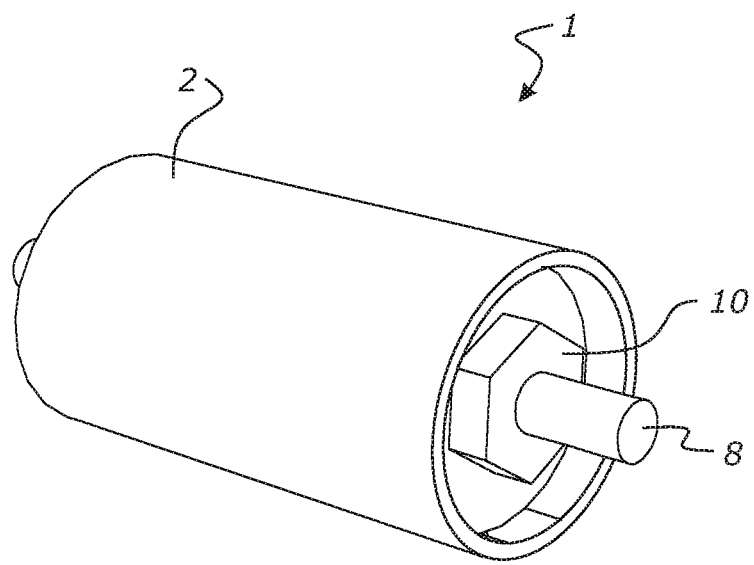
FIG. 1B shows a connector with a casing with no split.

Expansion and contractions may occur preferably under the application of a force to the casing as for example shown in FIG. 1A, to change the shape of the internal cross section. The force may be applied directly or via a bias such as may be provided by a spring or springs. An adjustable member may be associated with the casing for applying the force to the casing and for setting and varying the sliding frictional engagement between an elongate spring and damping assembly, and the casing. The varying of the frictional engagement may occur due to the split of the casing, which allows at least a portion of the casing to assume a more expanded or contracted internal cross sectional area or shape. In the version of the casing of FIG. 1B, the force between the casing and the spring and damping assembly may be set at the time of assembly. A friction fit can be established at assembly to ensure that the casing applies a radial force to the spring and damping assembly for use. The casing may be heated during assembly to cause it to expand allowing an easier locating of the spring and damping assembly inside the casing. As the casing cools, it will apply greater radial force to the spring and damping assembly so that the connector is then presented ready for use.

The expansion or contraction of the casing may occur due to a bias towards an expansion or contraction of cross-sectional area or shape that acts against the spring and damping assembly. For example, when the casing is not yet engaged with the spring and damping assembly, the casing may be in a more contracted in cross-sectional area or shape. However, when already frictionally engaged with the spring and damping assembly, a further application of force towards a more contracted cross-sectional area or shape of the casing may not change the cross-sectional area or shape, but rather increase the frictional engagement of the casing with the spring and damping assembly.

At least one bearing element is preferably provided to bear against an end of the spring and damping assembly. In forms where the connector is to be operative under only one direction of linear displacement of the casing and spring and damping assembly, a bearing element may be provided only at one end of the spring and damping assembly. In forms where the connector is to act under both directions of linear displacement a bearing element is preferably provided at each end of the spring and damping assembly.

Whilst in a preferred form the casing is to be connected to the second structural member, in some forms the at least one bearing element is for connection to the second structural member.

Adjustment of the internal shape of the casing is preferably able to be made to vary the frictional engagement of the casing with the spring and damping assembly, in order to vary the damping effect of the connector on the displacement between the two structural members.

In use, the first and second structural members, and thus the connector connected between them, may be subjected to an external force. Once the external force exceeds a first predetermined threshold, the spring and damping assembly is able to be elastically deformed. Where a rod is provided within the casing and for connection to the first structural member, this deformation of the spring and damping assembly preferably occurs along the rod between the at least one bearing element and the stop of the rod. The elastic compression of the spring and damping assembly causes displacement of components of the spring and damping assembly relative with the casing, and the frictional engagement of the spring and damping assembly with the casing provides damping.

The maximum relative displacement of the connected first and second structural members may be determined by the maximum elastic compression of the spring and damping assembly.

Upon the reduction of the external forcing below a second predetermined threshold the bias caused by the springs of the spring and damping assembly exceeds the frictional engagement between the displaced portions of the spring and damping assembly and the casing, and the first and second structural members are caused to return under the bias towards their initial relative positions. An ability to return to their initial position can be achieved in some embodiments of the connector where the spring is preloaded when in the initial relative position.

The external forces to which the connector is to be exposed may include forces resulting from earthquakes or other seismic activity, vibration, wind, or other natural or man-made external loadings.

The connector of the present invention may commonly be used for connecting between two structural members of buildings, but may also be used in any other application where any force is to be resisted. In a building, the two structural members might be, for example a post, beam, joist, rafter, brace, wall or panel, or a foundation or footing. The connector or a plurality of such connectors may be utilised in connections of different lateral load resistant systems such as braced frames, moment resisting frames, or shear walls.

As described, the connector of the present invention may return at least some of the residual relative displacement of two connected structural members following an external forcing event. However, in preferred forms the connector provides for the returning of all or substantially all residual displacement between first and second structural members so that such are returned to their initial relative position on the basis that the forces on the two structural members permit such return. In order to provide for the full returning of all relative displacement of the first and second structural members to an initial relative position after an event, the spring force of the spring and damping assembly at all times exceed the frictional engagement of the spring and damping assembly with the casing.

Under external forcing of the first and second structural members below the level of the first predetermined threshold the connector may not allow for elastic deformation of the spring and damping assembly and relative displacement of the first and second structural members. This may be desirable in order to limit drift of a structure under serviceability loads. The first predetermined threshold may be determined by the frictional engagement of the relevant outer-most portion of the spring and damping assembly which is in frictional engagement with the casing. The adjustment of the adjustable member of the casing may therefore be used to set the first predetermined threshold.

Under a reduction of the external forcing below the second predetermined threshold the connector may begin to return displacement of the two structural members. The second predetermined threshold may be determined at least in part by a degree of pre-stressing or pre-loading of the spring and damping assembly. This pre-stressing provides an initial degree of elastic deformation of the spring and damping assembly. For example, this pre-stressing may be provided by an initial compression of the spring and damping assembly between stops of the rod, and/or bearing members.

The degree of pre-stressing may influence both the second predetermined threshold at which the connector will begin to return displacement, and also the rate of return of displacement under a ceasing or reduction of the external force.

The spring and damping assembly may comprise one or more spring and damping stages. Each of these spring and damping stages may provide specific spring and damping characteristics. In the preferred form, each of these spring and damping stages are individually and progressively elastically deformed over the stroke of the connector. Preferably each stage is designed to provide the same spring and damping characteristics, though it is envisaged that stages may be different to each other.

The degree of adjustment of the internal cross-sectional shape of the casing may be substantially homogeneous over the length of the casing. Alternatively, it may be varied along the length to provide for variable resistance and damping characteristics over the stroke the connector.

The bias acting on the casing may bias the casing towards a smaller cross-section, or may bias it towards a larger cross-section. For example, the unbiased cross-section of the casing may be greater in size than the cross-section of the spring and damping assembly, and thus require biasing towards a smaller size in order to frictionally engage with the spring and damping assembly. Alternatively, the unbiased casing may be smaller in cross-section than the spring and damping assembly, and thus require biasing toward a larger size in order to allow the entry of the spring and damping assembly therein, and to reduce the frictional engagement with the spring and damping assembly.

In a preferred form the frictional engagement of the inside of the casing with the spring and damping assembly, and the physical characteristics of the casing and spring and damping assembly, are such that under action of the connector only elastic deformation of the spring and damping assembly and sliding at the friction surfaces occur. In this manner the connector may be resilient.

It is considered desirable to prevent plastic deformation of the spring and damping assembly, particularly at the friction surfaces, in order to increase the service life of the connector and reduce the requirement for maintenance between external forcing events. However some degree of plastic deformation at the friction surfaces may occur under particular circumstances.

Embodiments of the connector may be provided allowing for the action of the connector by the compression of the spring and damping assembly under only one of tension or compression on the connector. In such connectors where the spring and damping assembly is elastically deformed only under one of tension or compression of the connector, the connector may either allow substantially un-resisted relative displacement of the structural members, or may prevent relative displacement of the structural members.

In preferred forms which will now be described, the elastic deformation of the spring and damping assembly comprises an elastic compression of the spring and damping assembly. However other spring and damping assemblies may elastically deform in other ways during the action of the connector, such as by stretching under tension.

Examples of the invention will now be described with reference to the drawings. Shown in FIG. 1A is an embodiment of the resilient slip friction connector of the present invention. The connector 1 is for connecting between two structural members of a structure.

The connector 1 has two main functions. First, the connector 1 provides resistance to and damping of an external force which induces relative moment between the two structural members to which the connector 1 is connected. Secondly, the connector 1 is to provide a bias on the two structural members when they are displaced away and/or towards each other, following external force caused relative displacement of the members from an initial relative position. This bias of the connector is to be such that it causes or aids in causing the return of the structural members to or towards their initial relative position from a translated relative position.

As seen in the embodiment of FIG. 1A, the connector 1 comprises a casing 2. Preferably, the casing 2 is in the form of an elongate hollow casing having at least one elongate split 3 allowing the casing 2 to expand and contract its internal cross-sectional area or change its cross-sectional shape. The split may be linear and along the entire length of the casing.

The casing may be of one component having a split or not of two or more components assembled together to define an internal surface or surfaces 600 to an internal cross sectional area.

Figure 3A:
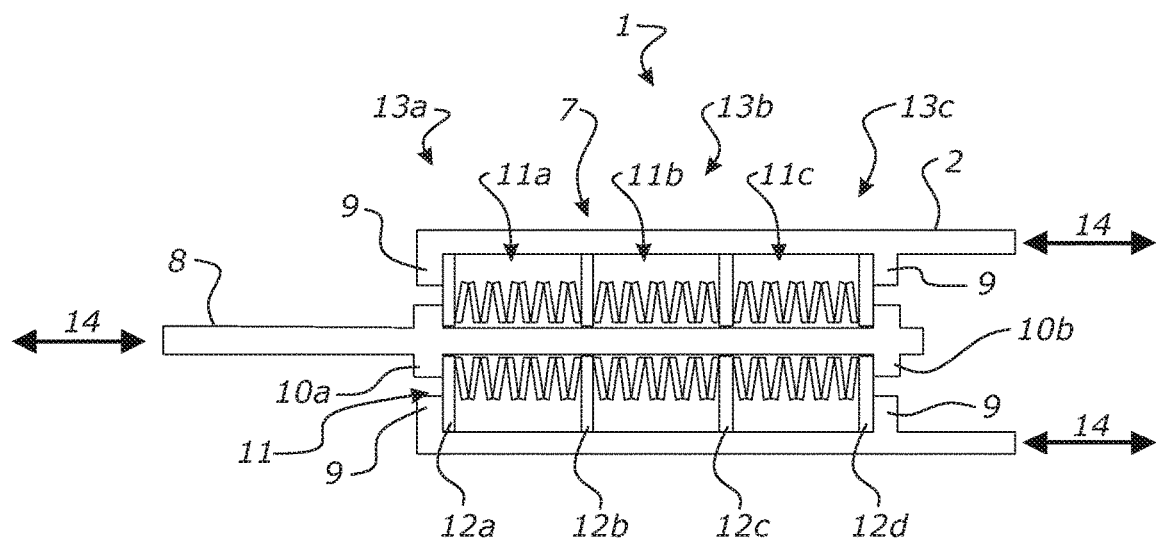
FIG. 3A shows a side cut-away view of an embodiment of a double acting connector.
Figure 3B:
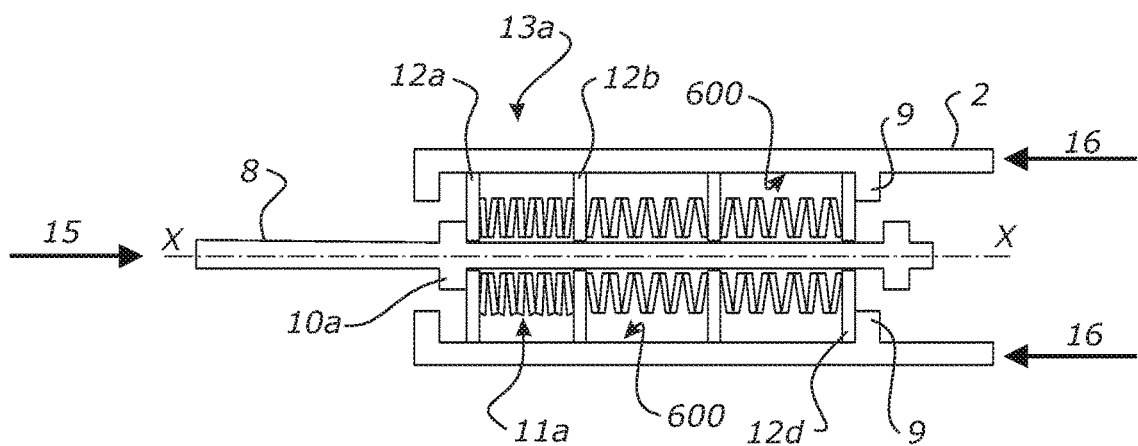
FIGS. 3B-3D show stages of action of the connector of FIG. 3A under a compressive loading of the connector.

The casing has a national axis 700 x-x as shown in FIG. 3B. The connector 1 may comprise an adjustable member 4 for the casing 2 for adjusting the cross section shape for applying a force to the casing for setting and varying the sliding frictional engagement between the spring and damping assembly and the casing.

As seen in the configuration of FIG. 1A, the casing 2 comprises an elongate substantially cylindrical body having an elongate split 3 extending along one side of the body. In this configuration, the adjustable member 4 of the casing is provided by a plurality of bolts 5 and nuts 6 connected across the elongate split and arrayed along the elongate split 3. The tensioning of a bolt 5 and nut 6 of FIG. 1A would be such as to effect a contraction of the internal cross-sectional area of the casing 2. In alternate configurations where the expansion of the casing 2 along the elongate split is to be desired, a similar bolt and nut connection may be provided to expand the casing 2 at the elongate split plane, thus expanding the cross-sectional area of the casing 2. The internal surface or surfaces may be cylindrical in shape defining one constant cross section region for sliding engagement. It may be of multiple shapes of constant cross section for each or several of the damper members to slide. The surfaces may be of polygonal cross section. They are preferably not tapered surfaces. This helps ensure that the friction force between the damper member and its casing surface or surfaces it slides along remains constant over its range of travel.

The purpose of the adjustable member 4 of the casing 2 where provided is to allow control of the frictional engagement of the internal surfaces 600 of the casing 2 with a spring and damping assembly 7. The spring and damping assembly is for connection to a first structural member. The spring and damping assembly 7 acts in combination with other components of the connector 1 to provide resistance to external forces, damping of external forces caused relative displacement, and the bias on the structural members to encourage return of them to or towards their initial relative position from a displaced position.

The spring and damping assembly 7 is preferably provided about a rod 8. In this configuration the rod 8 is for connection to the first structural member.

The rod 8 is not limited to being a substantially cylindrical rod, but may be a rod of many cross-section and dimensions such that it is able to be connected to a structural member and apply a load from the first structural member to at least one end of the spring and damping assembly 7. Furthermore, the rod may be of a substantially rigid form, or may be flexible such as in the form of a cable or chain.

The connector 1 further comprises at least one bearing member 9 for bearing against an end of the spring and damping assembly 7. There may be two bearing members 9 for bearing against both ends of the assembly 7.

A linear displacement of the first and second structural members relative each other will result in relative displacement of the casing 2 and the spring and damping assembly 7. Preferably the connection of the first structural member to the spring and damping assembly is a connection at one end of the spring and damping assembly.

The relative movement is preferably such as to cause the spring and damping assembly to be elastically deformed by compression between one of its ends, preferably the connected end, and an at least one bearing element.

In embodiments wherein the connector comprises a rod 8 connected to the first structural member, the respective connections of the rod 8 and casing 2 to the first structural member and second structural member of the structure will result in elastic deformation by compression of the spring and damping assembly along the rod 8 between a bearing member 9 and a stop 10 of rod.

The compression of the spring and damping assembly 7 may comprise one or more stages of compression and damping.

Preferably the operative distance between the two stops 10*a* and 10*b* is the same as the distance between the two bearing members at each end of the casing.

The stops 10 of the rod 8 are preferably configured such that they may be adjusted along the rod so as to control a degree of pretension applied to the spring and damping assembly 7. While one such convenient form may be nuts and bolts threaded onto the rod 8, any other configuration able to provide for a limit of the spring and damping assembly on the rod and preferably also able to be adjusted in position along the length of the rod are contemplated within the scope of the invention. For example, one stop 10 may be permanently affixed or integrally formed with the rod 8, while the other stop 10 at the opposed end of the rod 8 is able to be adjusted in its position along the rod. In the configuration shown in FIG. 3A the distance between the two stops 10*a* and 10*b* is the same as the distance between the two bearing members 9 at each end of the assembly 7. Pre-stressing or compression of the springs may hence be due to the spacing of the stops and/or the bearing members.

The connector 1 is configured such that the bias of the spring and damping assembly 7 exceeds the frictional force between the spring and damping assembly 7 and the casing 2 when the external forcing event ceases or is decreased below a predetermined threshold. The result is that, when the external force ceases or decreases below a threshold, the rod 8 and casing 2, and their associated first and second structural members, are caused to return towards their initial position. In some forms the return of the first and second structural members may comprise simply a return towards their initial position, but preferably it comprises a return to their initial position. A sufficient pre-stressing or compression of the springs helps to achieve this to ensure that the force of the springs can overcome the resistance to movement due to friction between the casing and the assembly.

FIGS. 2A-2C show further details of the constituent components of the connector 1 of the embodiment of FIG. 1A. Shown in FIG. 2A is the casing 2 of the connector, and its elongate split 3 extending along the length of the casing. Also shown in FIG. 2A is an adjustable member 4 of the casing, being a bolt 5 and nut 6 for clamping of the casing 2 along the elongate split 3. FIG. 2B shows the different components of the spring and damping assembly 7 and rod 8 of the connector 1 of FIG. 1A. The shown spring and damping assembly 7 comprises at least one damping member 12 and a spring arrangement that may comprise of at least one spring member or spring set 11. Also seen in FIG. 2B is a stop 10 of rod 8, for bearing against the end of the spring and damping assembly 7 on the rod 8.

FIG. 2C shows the assembled spring and damping assembly 7 on the rod 8 of the configuration of FIG. 1A. This spring and damping assembly comprises a plurality of spring and damping stages 13 arrayed between the stops 10 of the rod 8. Each spring and damping stage 13 comprises at least one spring member or spring set 11 and at least one damping member 12. In a preferred form seen in FIG. 2C, the spring and damping assembly 7 comprises at each end adjacent the stop 10 of the rod a damping member 12. In other forms however, the spring and damping assembly 7 may comprise only a damping member 12 adjacent one of the stops 10 and a spring member 11 adjacent the other, or it may alternately comprise spring members 11 at each of its ends adjacent the stops 10.

The spring set may comprise of one or more individual spring elements such as a stack of Belleville washers.

The operation of a connector 1 according to the present invention will now be described with reference to FIGS. 3A-3D. The views of FIGS. 3A-3D show a cross-section of an embodiment of the connector.

FIG. 3A shows a connector 1 comprising a casing 2 and spring and damping assembly 7 provided about a rod 8 located within the casing 2. The spring and damping assembly 7 is constrained on the rod 8 between two spaced apart stops 10 of the rod. It is also constrained within the casing 2 at each end between bearing members 9, here provided at both ends of the casing 2. The casing 2 is for connection to a second structural member (400), and the rod 8 is for connection to a first structural member (401). As previously described in relation to the embodiment of FIG. 1A, though not shown in the cross-sections of FIGS. 3A-3D, the casing 2 comprises an elongate split 3 and adjustable member 4 for setting and varying the sliding frictional engagement between the spring and damping assembly and the casing.

The connector of FIG. 3A has a spring and damping assembly 7 comprising three spring sets 11a, 11b, 11c and four damper members 12a-d defining damping stages 13A, 13B and 13C. Each spring and damping stage may comprise a damping member 12 and a plurality of spring members 11. The spring and damping assembly 7 of FIG. 3A also demonstrates the preferred form wherein damping members 12 are provided at each end of the spring and damping assembly adjacent the stops 10A and 10B of the rod 8 to press there against.

In the configuration of FIG. 3A-3D, the connector is able to act by the compression of the spring and damping assembly 7 under relative motion of the casing 2 and rod 8 in both longitudinal directions as denoted by the arrows 14. Such a connector 1 may be known as a bi-directional connector, double acting connector, or as a connector capable of acting in both tension and compression, where tension and compression refer to the overall forces acting on the connector 1 due to resistance of and the relative displacements of the associated first and second structural members.

FIG. 3B shows the first stage of action of the connector 1 of FIG. 3A under the compression of the connector, being the displacement of the rod 8 in the direction of the arrow 15 and the displacement of the casing 2 in the direction of the arrows 16. The displacement of the rod 8 relative the casing 2 in the direction of the arrow 15 causes the stop 10A of the rod to act against the first damping member 12A of the spring and damping assembly 7.

The displacement of the rod 8 causes the compression of the first stage 13A of the spring and damping assembly. Under the compression of the first stage 13A the damping member 12A is moved in the direction of the arrow 15, and the array of spring members 11A are compressed in the direction of the arrow 15. As the spring and damping stage 13A is compressed, the damping member 12A absorbs energy due to its sliding frictional engagement with the inside of the casing 2 and the array of spring members 11A absorb energy due to their compression.

During the compression of the first spring and damping stage 13A, the spring force of the compressed spring member or array of spring members 11A is supported in the direction of the arrow 16 by the adjacent damping member 12B. Once the first spring and damping stage 13A is compressed such that the spring force of the spring member or array of spring members 11A is greater than the frictional engagement of the second damping member 12B with the casing 2, the second damping member 12B will also start to move in the direction 15. This causes the compression of the second spring and damping stage 13B as shown in FIG. 3C.

Figure 3C:
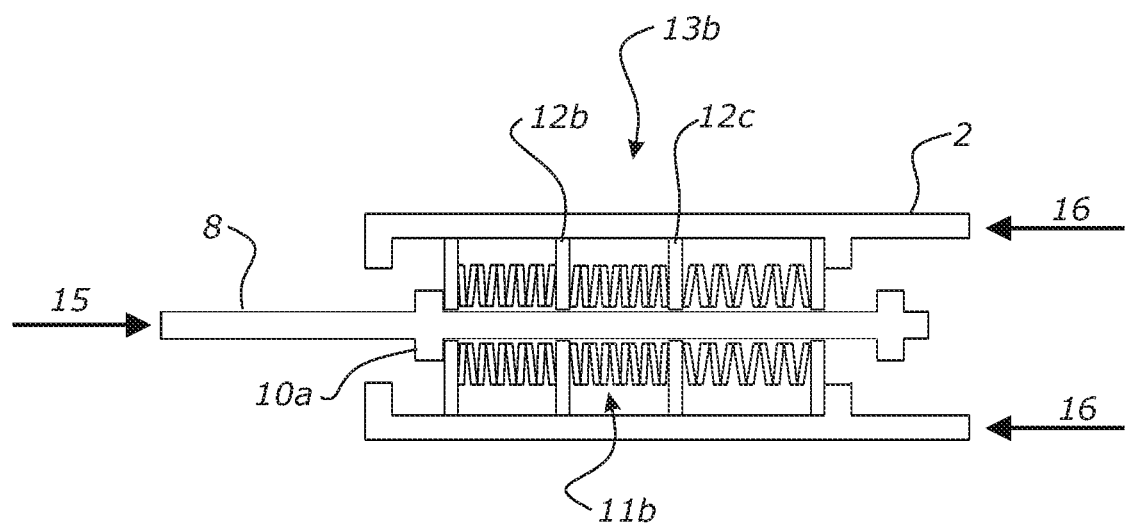

As seen in FIG. 3C, the compression of the spring member 11A of the first spring and damping stage 13A has been such that the frictional resistance to movement of the second damping member 12B with the casing 2 has been overcome, and the second stage 13B of the second spring and damping stage 13B has been compressed.

Figure 3D:
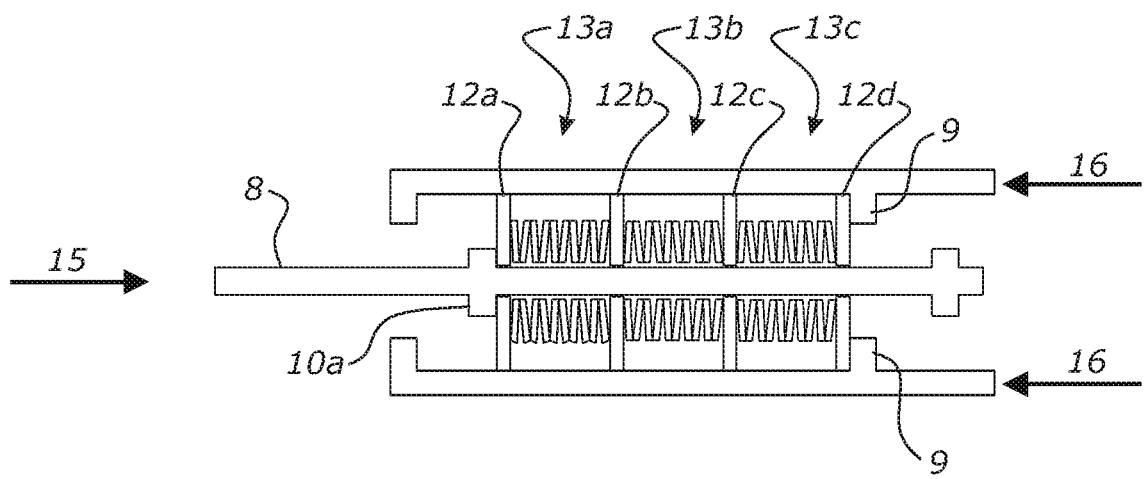

FIG. 3D shows the connector 1 having a fully compressed spring and damping assembly 7, wherein each of the spring and damping stages 13A, 13B, and 13C have been fully compressed. The damping member 12D acts against the bearing members 9 to prevent the sliding of the damping member 12D in the direction of the arrow 15. Unless the spring members 11 of each spring and damping stage is capable of further compression, this state defines a limit of relative displacement of the rod 8 with respect to the casing 2.

Figure 4A:
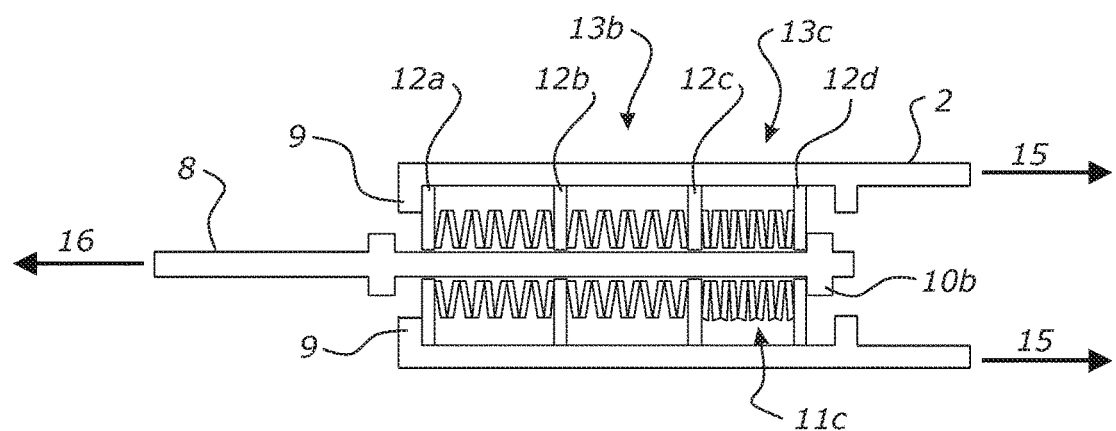
FIGS. 4A-C show stages of action of the connector of FIG. 3A under a tension loading of the connector.
Figure 4B:
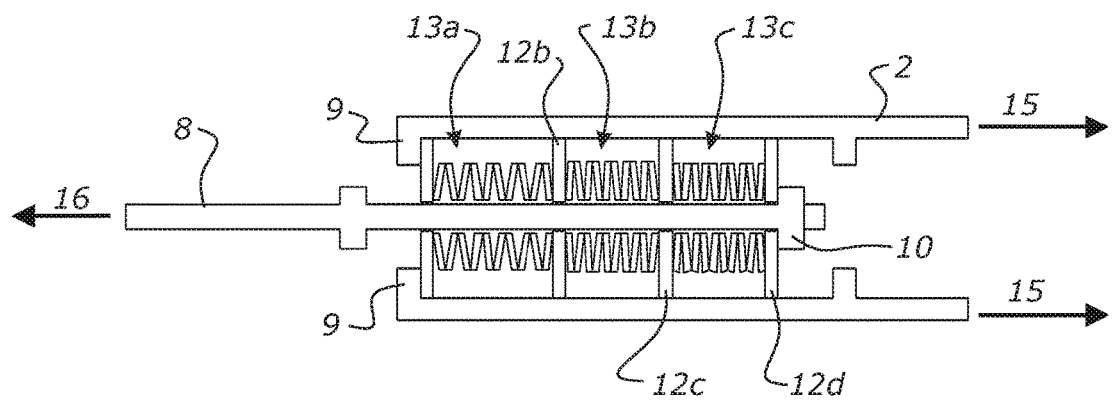
Figure 4C:
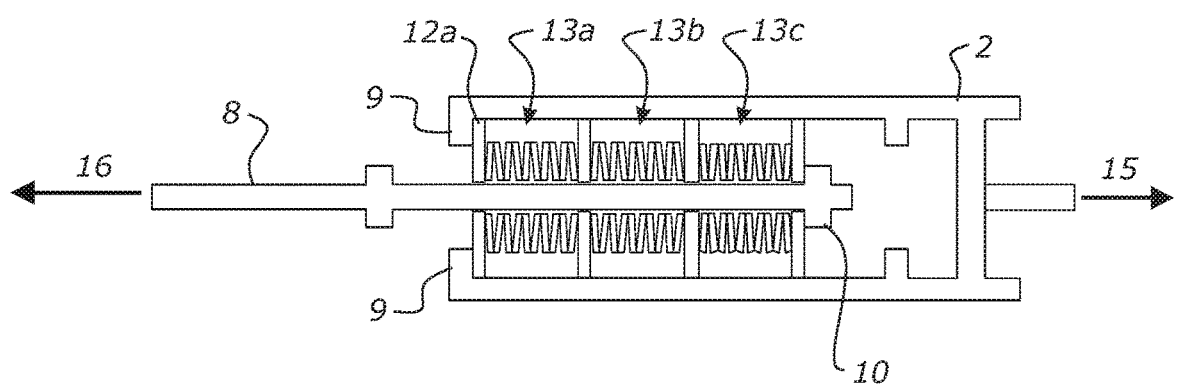

FIGS. 4A-4C show the action of a connector 1 under the reverse relative displacement as shown in FIGS. 3A-3D. FIGS. 4A-4C show the action of the connector under tension, being a relative displacement of its connected first and second structural members away from each other.

In FIG. 4A, the rod 8 has been moved in the direction of the arrow 16 and the casing 2 has been moved in the direction of the arrow 15 such as to compress the spring and damping stage 13C. To effect the compression of the damping stage 13C, the stop 1013 of the rod acts against the damping member 12D causing it to slide within the casing 2. The displacement of the damping member 12D causes the compression of the spring member 11C.

As previously described in relation to the action of the connector 1 in compression, continued displacement of the rod 8 in the direction of the arrow 16 will cause continued compression of the spring member 11C and an increase in its spring force. Once the spring force of the spring member 11C is sufficient to overcome the frictional engagement of the damping member 12C with the casing 2, the damping member 12C will begin to slide relative the casing and cause the compression of the second spring and damping stage 13B.

FIG. 4B shows this next stage of action of the connector, wherein the spring and damping stage 13B has been compressed. Once the spring force of the spring member 11B overcomes the frictional engagement of the damping member 12B with the casing 2 the damping member 12B will also begin to move in the direction of the arrow 16 and result in the compression of the spring and damping stage 13A. Once all three spring and damping stages 13A, 13B, and 13C have been fully compressed, the damping member 12A is most forced against the bearing members 9 and further displacement of the spring and damping assembly relative to the casing is restricted.

During an external forcing event, such as an earthquake, vibration or other external forcing, a connector 1 may be acted on so as to displace the rod 8 relative the casing 2 as has been described in relation to FIGS. 3A-3D, and 4A-4C. Upon the ceasing or sufficient reduction of the external forcing event, the first and second structural members may still be displaced from their initial translational position, meaning that the connected rod 8 and casing 2 of the connector 1 will also be displaced from their initial position. Under the action of the connector through any of the stages or part stages of compression of the spring and damping stages 13 seen from FIG. 3A-4C, the connector 1 acts to aid in the return its components and the connected first and second structural members towards their initial positions. This functionality is provided by the interrelationship of the spring force of the spring members 11 and the frictional engagement of the damping members 12 with the casing 2.

In order to provide for returning of relative displacement by the connector, the spring force of a compressed spring member 11 should exceed force resisting movement due to the frictional engagement of its associated damping member 12 with the casing 2 over its full range of travel. Provided that the spring force of the spring member 11 exceeds force resisting movement due to the frictional engagement of the damping member 12 with the casing 2, upon ceasing of the external force the stored energy of spring members 11 can overcome the resistance to movement caused by the frictional force on damping members 12 by the casing, and to return the rod 8 and casing 2 to their initial relative positions.

An example of such returning of relative displacement will now be described with reference to FIG. 4B. Were the external forcing in the directions of the arrows 15 and 16 reduce below a threshold or to cease, the stored energy of the compressed spring and damping stages 13B and 13C can be released, and the damping members 12C and 12D can be forced in the direction of the arrows 15 towards their initial position.

A preferred theoretical design procedure of an example connector will now be described. The variables to be referred to in the design procedure are listed below.

$F_{friction}$ Total friction force
$\mu$ Coefficient of friction
$n_{bolt}$ Number of clamping bolts
$F_{pr,bolt}$ Pre-stressing force in each clamping bolt
$F_{pr,rod}$ Pre-stressing force of the longitudinal rod
m Number of individual spring stacks between friction discs
n Number of the friction discs
$F_{slip,i}$ Slip force corresponds to the slip of $i^{th}$ friction disk
$\Delta_{slip,i}$ Displacement corresponds to the slip of $i^{th}$ disc
$k_i$ Stiffness of $i^{th}$ spring stack
$F_{ult}$ Ultimate loading capacity
$\Delta_j$ Displacement of $j^{th}$ spring stack at the slip of $i^{th}$ friction disk
$\Delta_{max,j}$ Maximum displacement of the $j^{th}$ spring stack when the stack is fully compressed
$F_j$ force in the $j^{th}$ spring stack at the slip of $i^{th}$ friction disk
$F_{restoring,i}$ restoring force corresponds to the re-centring slip of $i^{th}$ friction disk
$F_{residual}$ The residual unloading force in the damper The following table lists a set of theoretical design equations which may be used in the design and to determine the characteristics of a connector of the present invention.

| | Equation | Description |
|---|---|---|
| (1) | $F_{friction} = 2\pi\mu F_{pr,bolt} n_{bolt}$ | Total friction force |
| (2) | $F_{pr,rod} > F_{friction}$ | Self-centring condition |
| (3) | $F_{slip,0} = F_{pr,rod} + \dfrac{f_{friction}}{n}$ | First slip force |
| (4) | $F_{slip,1} = F_{slip,0} + \dfrac{f_{friction}}{n}$ and $\Delta_{slip,1} = \dfrac{f_{friction}}{n*k_1}$ | Second slip force and its corresponding displacement |
| (5) | $F_{slip,i} = F_{slip,i-1} + \dfrac{f_{friction}}{n}$ and $\Delta_{slip,i} = \sum_{i=1}^{i-1}\Delta_j + \dfrac{f_{friction}}{n*k_i}$ | The $i^{th}$ slip force and its corresponding displacement. It should be noted that the sign "Σ" refers to the displacement of other disk stacks which should be added to the $i^{th}$ one. |
| (6) | $\Delta_j = \min\left\{\dfrac{F_j}{k_j}, \Delta_{max,j}\right\}$ | Displacement of $j^{th}$ spring stack at the slip of $i^{th}$ friction disk. |
| (7) | $F_j = F_{slip,i} - j*\dfrac{f_{friction}}{n}$ | Force in the $j^{th}$ spring stack at the slip of $i^{th}$ friction disk. |
| (8) | $F_{ult} = F_{slip,m-1} + k_m * \Delta_{max,m}$ | Ultimate loading capacity. |
| (9) | $F_{restoring,m} = k_m * \Delta_{max,m} - \dfrac{f_{friction}}{n}$ | Restoring force at the maximum displacement. |
| (10) | $F_{restoring,m-1} = F_{restoring,m} - \dfrac{f_{friction}}{n}$ and $\Delta_{restoring,m-1} = \Delta_{ult} - \Delta_{slip,1}$ | Restoring force at the second re-centring slip. |
| (11) | $F_{restoring,i} = F_{restoring,i+1} - \dfrac{f_{friction}}{n}$ and $\Delta_{restoring,m-1} = \Delta_{ult} - \Delta_{slip,i}$ | Restoring force at the $i^{th}$ re-centring slip. |
| (12) | $F_{residual} = F_{restoring,0} = F_{pr,rod} - \dfrac{f_{friction}}{n}$ | The residual unloading force in the damper. |

With reference to the list of variables and the equations provided above, a theoretical design procedure to predict various characteristics of a connector will now be described.

The total frictional engagement of a casing with its spring and damping assembly may be determined by equation (1).

In order to restore displacement of a connector, the degree of pre-stressing of the spring and damping assembly should be greater than the total frictional force calculated in equation (1). See equation (2).

The primary variables in the calculation of the slip forces of the connector, as listed above, are:
Number of damping members i=0 to n, and
Number of individual spring members between the damping members j=0 to m.

The external force to result in slipping of each successive damping member 12 may be calculated by equations (3)-(5) as the sum of the pre-stressing force applied between the stop 10 of the rod 8, and the ratio of the total frictional engagement with the number of damping members:

$$F_{slip,0} = F_{pr,rod} + \frac{f_{friction}}{n}$$

$$F_{slip,1} = F_{slip,0} + \frac{f_{friction}}{n} \text{ and } \Delta_{slip,1} = \frac{f_{friction}}{n*k_1}$$

$$F_{slip,i} = F_{slip,i-1} + \frac{f_{friction}}{n} \text{ and } \Delta_{slip,i} = \sum_{j=1}^{i-1}\Delta_j + \frac{f_{friction}}{n*k_i}$$

As shown above, the displacement due to the compression of each spring and damping stage 13 is determined by the total frictional force divided by the number of damping members and the spring constant of the spring being compressed. The total displacement due to the compression of multiple spring and damping stages 13 is the sum of each individual stage's displacement.

The compression of each spring member 11 of each spring and damping stage 13 may be calculated as being the minimum of a) the force applied at the spring member divided by its spring constant, and b) its maximum compression. Per equation (6):

$$\Delta_j = \min\left\{\frac{F_j}{k_j}, \Delta_{max,j}\right\}$$

The force applied at each spring stage may be calculated from taking the slip friction threshold at the next associated damping member, and subtracting the multiple of the frictional engagement force with the number of the spring and damping member in that spring and damping stage divided by the number of total damping members. See equation (7):

$$F_j = F_{slip,i} - j * \frac{f_{friction}}{n}$$

The ultimate external force at which all stages of the spring and damping assembly are fully compressed and the displacement of the connector is maximised may be calculated by the sum of the force at the slip threshold of the second to final damping member and the product of the spring constant of that stage's spring with its maximum compression, per equation (8):

$$F_{ult} = F_{slip,m-1} + k_m * \Delta_{max,m}$$

The forces during restoring may then be calculated as follows, according to equations (10)-(12):

$$F_{restoring,m} = k_m * \Delta_{max,m} - \frac{f_{friction}}{n}$$

$$F_{restoring,m-1} = F_{restoring,m} - \frac{f_{friction}}{n} \text{ and } \Delta_{restoring,m-1} = \Delta_{ult} - \Delta_{slip,1}$$

$$F_{restoring,i} = F_{restoring,i+1} - \frac{f_{friction}}{n} \text{ and } \Delta_{restoring,m-1} = \Delta_{ult} - \Delta_{slip,i}$$

The residual unloading force in the connector may be calculated per equation (12) as:

$$F_{residual} = F_{restoring,0} = F_{pr,rod} - \frac{f_{friction}}{n}$$

Figure 9:
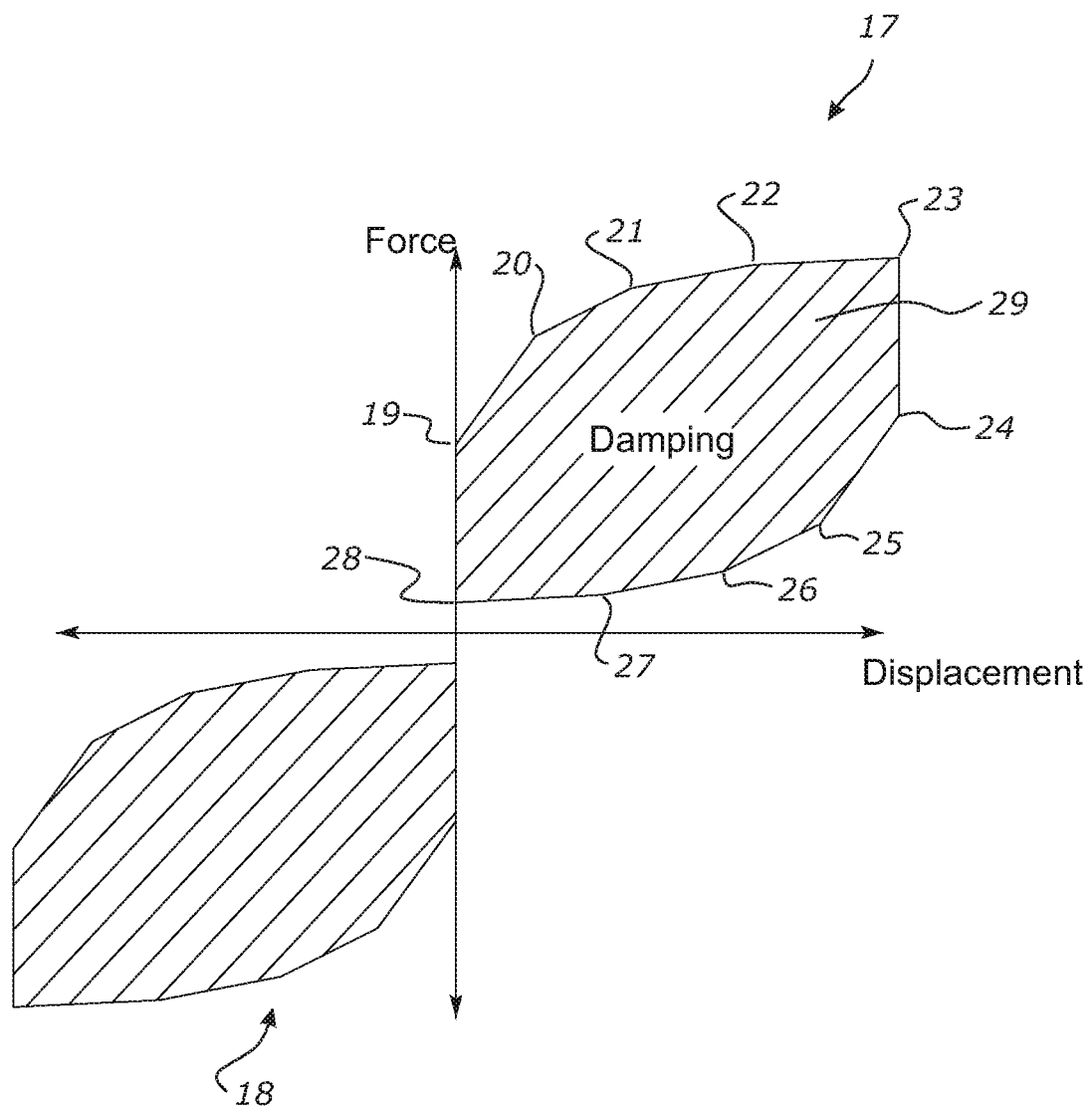
FIG. 9 shows a theoretical hysteresis performance being the applied force and displacement of an embodiment of a connector of the present invention.

FIG. 9 shows the predicted hysteresis characteristics of a connector according to the present invention. FIG. 9 will now be described, with reference to the variables and equations defined above.

Seen in the second quadrant 17 of the graph of FIG. 9, the connector 1 is utilised in tension as previously described.

In order to cause initial compression of the spring and damping assembly 7 an initial force $F_{slip,0}$ at 19 must be provided between the rod 8 and the casing 2. The force $F_{slip,0}$ at 19 is determined by the frictional engagement of the first damping member 12 with the casing 2. External force beyond this threshold results in compression of the first spring member 11. Once the force reaches the threshold $F_{slip,1}$ at 20 the slipping of the second damping member 12 will begin to occur, along with the compression of its associated spring member 11. This process of stage-wise compression of each spring and damping stage 13 continues until $F_{ult}$ at 23 at which the spring and damping assembly has been fully compressed.

For a number of damping member from i=0 to n, and a number of spring members j=0 to m, the values shown in the graph of FIG. 9 for the compression of the spring and damping assembly are:

$F_{slip,0}$ at 19,
$F_{slip,1}$ at 20,
$F_{slip,i}$ at 21,
$F_{slip,m-1}$ at 22, and
$F_{ult}$ at 23.

FIG. 9 also shows the restoring action of the connector upon the reduction and ceasing of the external force. As the external force reduces from $F_{ult}$ at 23 it reaches a threshold $F_{restoring,m}$ at 24 at which the first of the spring members 11 is able to overcome the frictional engagement of its associated damping member 12 with the casing 2. Further decreasing of the external force reduces the displacement of the connector as the first spring and damping stage decompresses. Further decreases of the external force will reach successive thresholds at which each of the following adjacent spring and damping segments can overcome the frictional engagement of their associated damping member 12 and decompress preferably all stages have their springs under pre-compression.

The predicted characteristics of the connector of FIG. 9 comprise a residual spring force of the spring member 11 such that all displacement of the connector may be returned. This is seen by $F_{residual}$ at 28 in FIG. 9.

For the restoring action of the connector, the values shown in FIG. 9 are:

$F_{ult}$ at 23,
$F_{restoring,m}$ at 24,
$F_{restoring,m-1}$ at 25,
$F_{restoring,j}$ at 26,
$F_{restoring,1}$ at 27, and
$F_{residual}$ at 28.

As shown in the predicted characteristics of FIG. 9, the connector exhibits a fully self-centring capacity, such that upon the sufficient reduction below $F_{residual}$ at 28 of the external forcing, all residual displacement of the connector is returned. Self-centring or re-centring being in reference to restoring to the original relative position. The residual force, $F_{residual}$ at 28, may be provided by pre-compression of the spring and damping assembly between the stops 10 of the rod. For example in the embodiment of FIG. 1, the stops comprise bolts which may be tightened or loosened along the rod in order to provide for a desired amount of residual force, $F_{residual}$ at 28, of the connector.

The total energy damped by the connector is represented by the shaded area 29 of FIG. 9.

Increases in the degree of residual force may be desirable for particular applications, such as to allow for total returning of the connector even in the presence of some remaining threshold of external forcing. However increases in the degree of residual forcing will decrease the total energy damped by the connector, as illustrated at the shaded area 29 in FIG. 9.

The action of the connector in the reverse relative motion as described in relation to quadrant 2 at 17 is shown in quadrant 3 at 18. If the action in relation to quadrant 2 at 17 is an action in tension, the action of the connector in quadrant 3 at 18 is to be an action in compression. The action in quadrant 3 is substantially identical to that described for the connector in tension, except that the external force is exerted in the opposite direction, and the displacement of the rod 8 and casing 2 relative each other is opposite. The use of multiple spring and damping stages results in a non linear force/displacement profile over the full range of motion of the spring and damper assembly in the casing.

In the embodiment of FIG. 1B the spring and damping assembly may be assembled into the casing of which the cross-sectional shape is fixed. The casing may not include a split as can be seen. The assembly may be established as a interference fit. Reference is made to, and which is hereby incorporated by way of reference to the publication Advanced Materials Research Vol 668 (2013) pp 495-499, FEM Analyses of Stress on Shaft-sleeve Interference Fits. Trans Tech Publications, Switzerland doi:10.4028/www.scientific.net/AMR.668.495

As has been previously described, different applications may have use of the connector such that it acts by the elastic deformation of the spring and damping assembly 7 under either or both action of the connector in tension or compression. In a configuration wherein the connector 1 provides its spring and damping action only under one of tension or compression on the connector, the connector only needs to comprise bearing members at one end of the spring and damping assembly 7.

Figure 10:
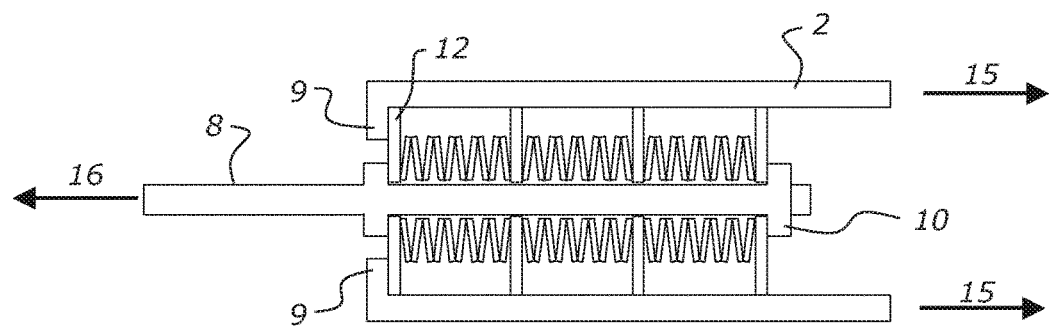
FIGS. 10 and 11 show embodiments of a connector which acts in one direction only.

For example, shown in FIG. 10 is an embodiment of the connector 1 wherein the connector provides its compression and damping action only under exposure of the connector 1 to tension. The connector under tension is indicated by the forcing of the rod 8 leftwards in the direction of the arrow 16, and the forcing of the casing 2 rightwards in the direction of the arrows 15. Under tension, the connector of FIG. 10 will cause the spring and damping assembly to be elastically deformed by compression between the bearing members 9 of the casing 2 and the stop 10 of the rod. Under the reverse relative displacement, being a forcing of the rod in the opposite of the direction of arrows 16, and a forcing of the housing of FIG. 10 in the opposite of the direction of the arrows 15, the spring and damping assembly is not compressed.

Figure 11:
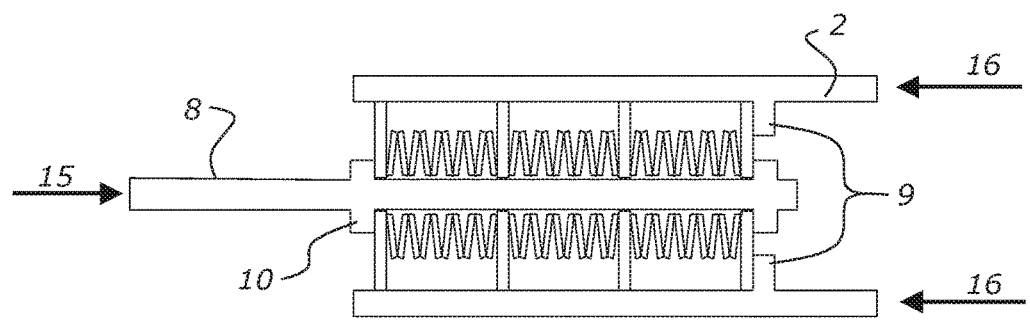

FIG. 11 shows a connector capable of providing relative displacement, damping, and positional restorative functions only under compression of the connector. In tension, the rod 8 is not prevented from moving relative to the casing 2 but preferably no damping or positional restorative functions are provided.

Figure 12A:
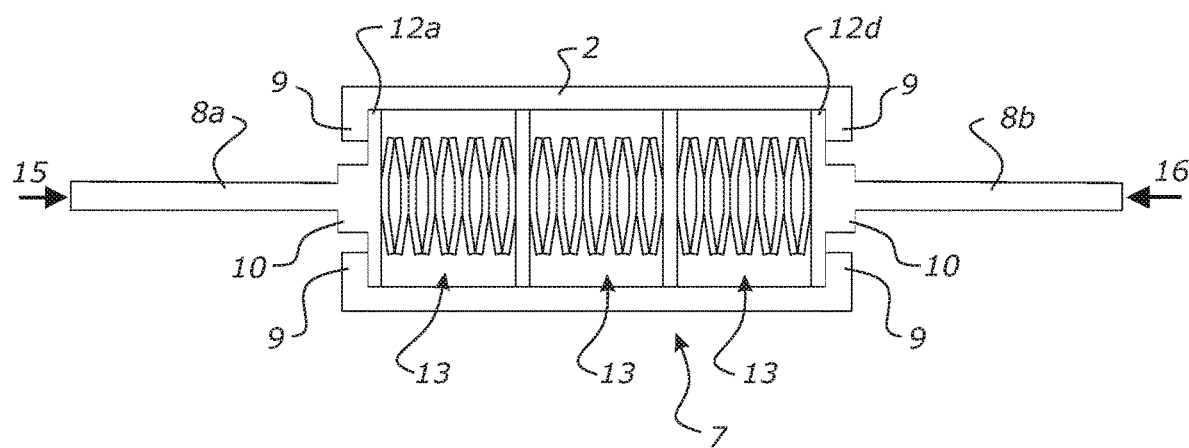
FIG. 12A shows a further embodiment of a connector which acts in compression direction only.

FIG. 12A shows a further variation of the connector 1 for use only in compression. As seen in FIG. 12A, the connector 1 comprises two separate rods 8A and 8B. The first rod 8A is connected to a first damping member 12A and the second rod 8B is connected to a further damping member 12D. The damping members 12A and 12D are provided as part of a spring and damping assembly 7 as previously described. The spring and damping assembly comprises three spring and damping stages 13. Under forcing of the rod 8A in the direction of the arrow 15, and the forcing of the rod 8B in the direction of the arrow 16, the spring and damping assembly may be progressively compressed as previously described, except that in this configuration it may be compressed from both ends simultaneously. In the variation of FIG. 12A, each of the rods 8A and 8B are for connection to the first and second structural members of the structure, rather than connecting such to a rod and the casing 2.

Were the connector of FIG. 12A to be exposed to opposite forcing, being forcing of rod 8A in the direction of arrow 16 and forcing of rod 8B in the direction of arrow 15, the bearing members 9 of the casing would act against the damping members 12A & 12D to prevent relative displacement of the rods with respect to the casing 2.

Figure 12B:
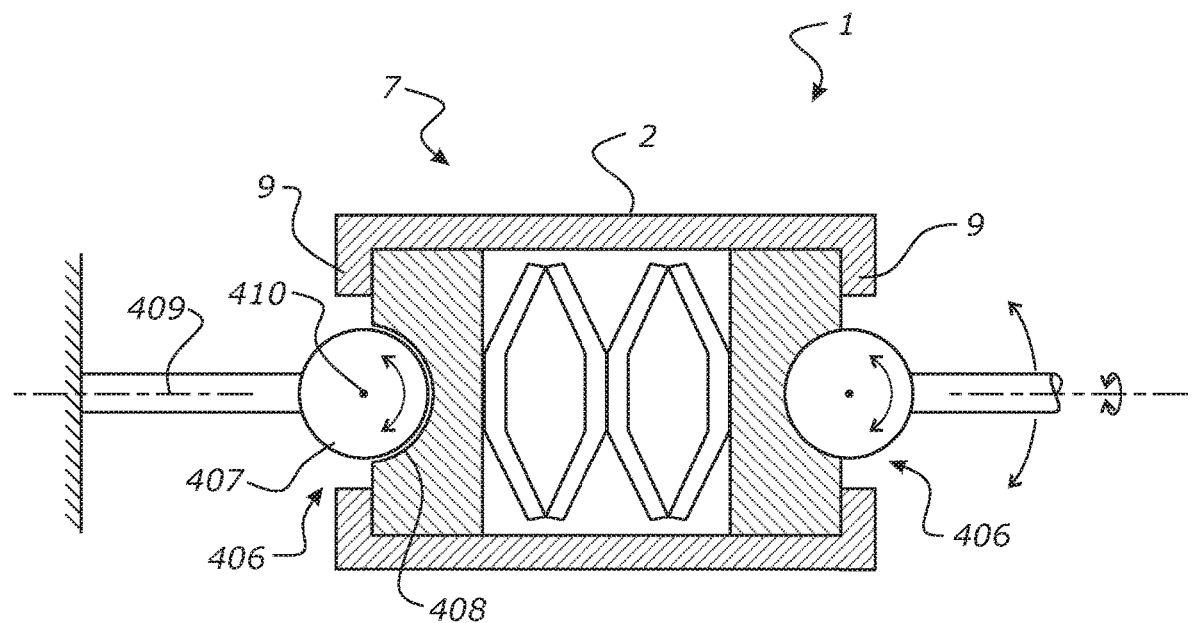
FIG. 12B is a view of a connector that includes a universal connection between structural components to illustrate that rotation in three axis of rotation can be accommodated by the connector.

FIG. 12B illustrates a variation of a connector where the casing 2 captures a spring and damping assembly 7 between bearing members 9 in a pre-stressed or compressed condition and where a ball and knuckle connection 406 exists between the first and second structural members and the spring and damper assembly 7 as seen. The ball 407 is able to locate in rebate 408 of a damper and this may be repeated at the other end of the connector 7. In this configuration there are degrees of freedom of rotation about the axis 409 and 410 allowing for drift or pivoting or other rotational or rotation inducing forces to be accommodated in or by the connector in the structural assembly utilising the connector 1. It may be that only at one end of the connector is such degree of freedom of rotation enabled. It may also be that alternative of such arrangements to allow for a degree of rotational freedom to be established between the connector 2 and the structural member or members with which it is engaged.

Figure 12C:
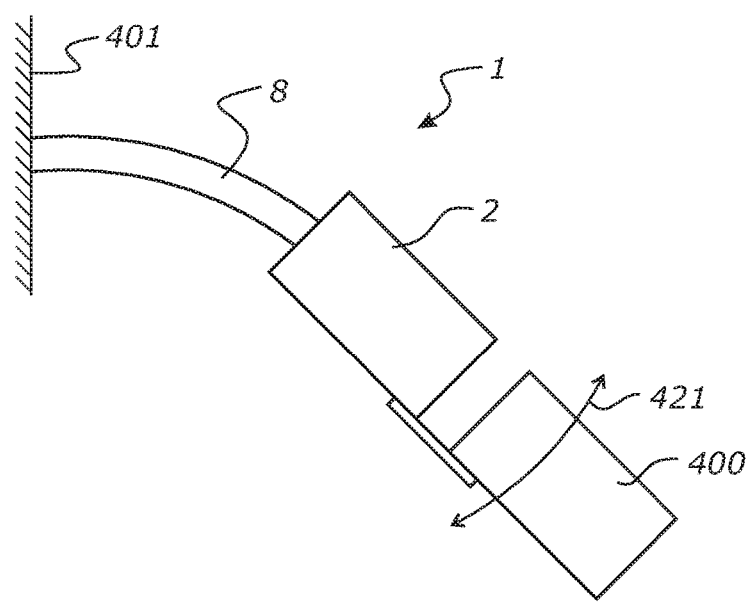
FIG. 12C is a view of a connector connected to two structural components to illustrate that the connection may also act in bending wherein the connection rod 8 is able to elastically bend.

In FIG. 12C, there is shown a connector 1 comprising of a casing 2 from which there projects a rod 8 that may be secured to first structural member 401 in a cantilevered manner as seen in FIG. 12C. The second structural member 402 may be connected to the casing 2 of the connector 1 and may move during translational displacement also in a rotational manner along the arc 421. The rod 8 may yield in an elastic manner to allow for such rotational displacement of the second structural member 400 to occur relative to the first structural member 401. The rod or other type of connection 8 between the connector 1 and the first structural member 401 may be such as to allow for an elastic yielding of the rod or other type of connector to occur during such displacement. Such elastic yielding will bias rotation of the first structural member relative to the second structural member back towards their initial on rotational position. A translational displacement is provided for by the connector as is herein being described.

Figure 13:
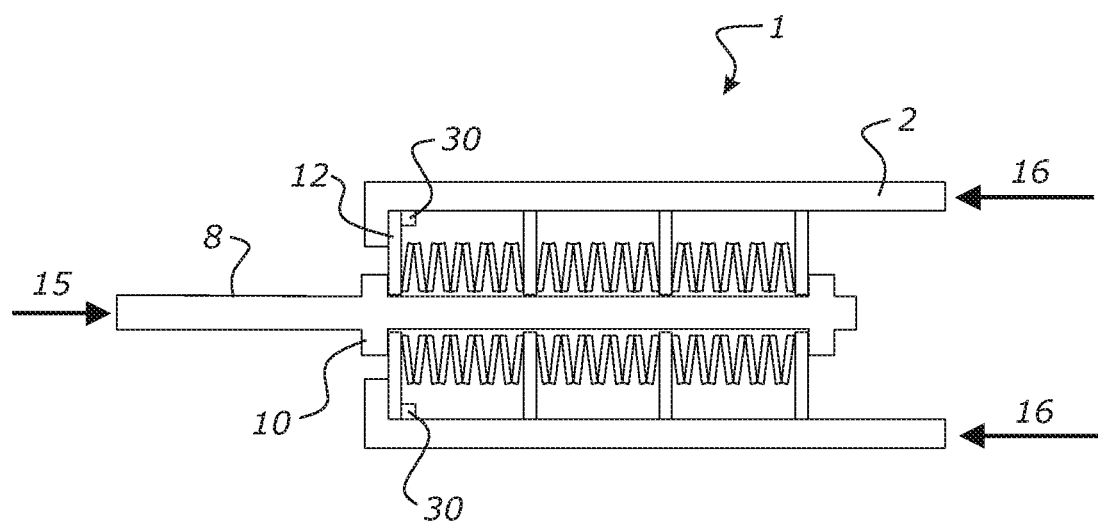
FIGS. 13 and 14 show a variation of the connector of FIGS. 10 and 11 respectively.
Figure 14:
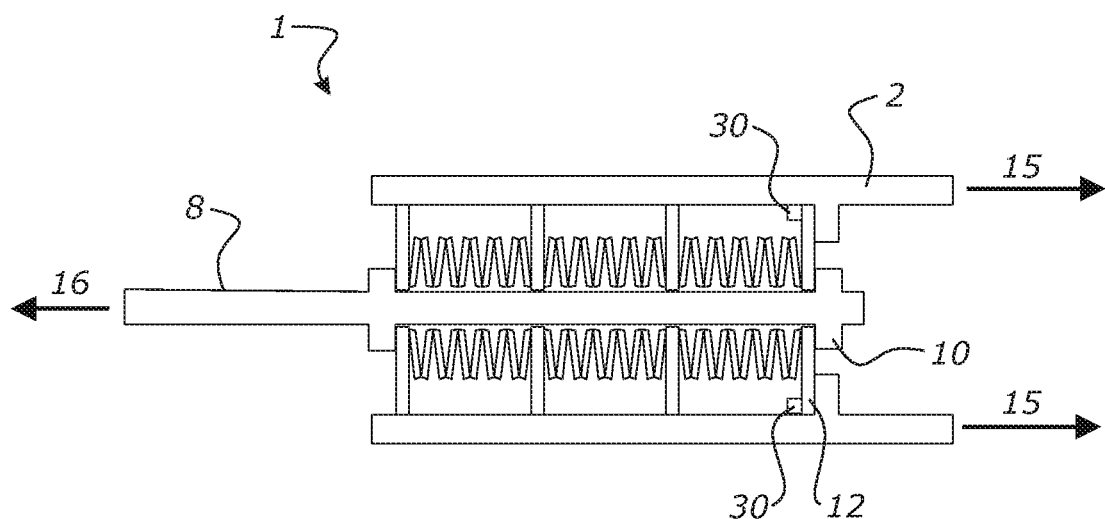

The use of a rod for example allows for omni-directional bending of the rod with a predictable response. The casing entrance where the rod enters is of a shape and configuration to not touch or constrain the rod from bending or pivoting relative the spring and damping assembly. In order to provide for a connector providing damping and restorative characteristics under only one of tension or compression, but preventing relative displacement under the other, an assembly as shown in FIGS. 13 and 14 may be provided. As seen in FIGS. 13 and 14, the connectors 1 each comprise at least one limit element 30. The limit elements 30 act to hold a damping member 12 between the limit element 30 and the bearing member 9. As a result, the connectors of FIGS. 13 and 14 are able to provide relative displacement, damping, and position restorative functions under tension and compression respectively, but are substantially locked and prevented from relative displacement of the rod 8 and casing 2 under the opposite forcing.

The same functionality of either unrestricted or prevented relative displacement in the non-acting direction of a tension-only or compression-only connector may be provided in configurations where the bearing member 9 is of a sleeve 40 rather than of the casing 2.

The spring and damping assembly 7 and each of the at least one spring and damping stages 13 may comprise discrete spring members 11 and damping members 12. Alternatively, each at least one spring and damping stage 13 may comprise at least one unitary spring and damping member 31. Each such unitary spring and damping member 31 may be capable of both frictional engagement with the casing 2 inside the casing, and of providing the bias of the spring and damping assembly 7 in order to enable the positional restorative functions of the connector. One such damping and spring member 31 may be a spring sized to frictionally engage with the inside of the casing 2. An example of such a type of spring may be a coned disc spring as seen in FIG. 16

Figure 16:
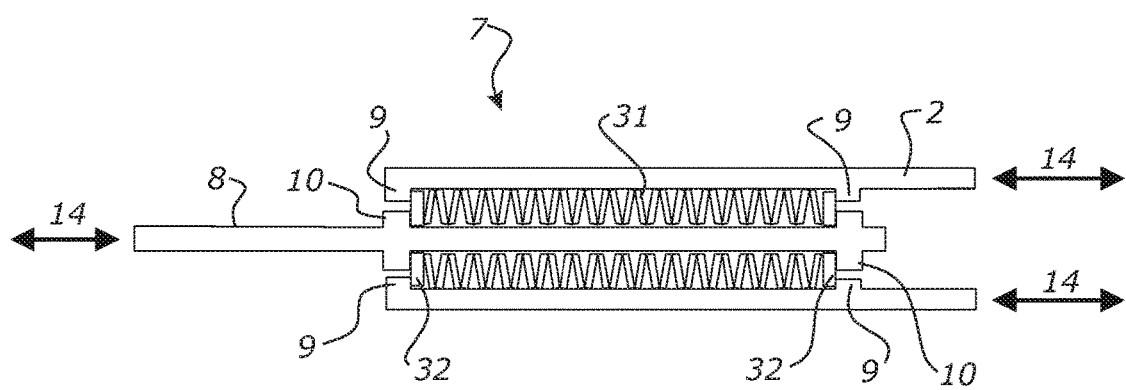
FIG. 16 shows a further embodiment of a connector having combined spring and damping members.

The connector of FIG. 16 comprises a rod 8, casing 2 and spring and damping assembly as described in relation to FIGS. 3 and 4, except the spring and damping assembly 7 comprises a plurality of combined spring and damping members 31. The spring and damping members 31 are shown in the configuration of opposing pairs of coned-disc springs provided along the rod 8 between limit members 32 and the stops 10 of the rod. The limit member 32 may optionally be provided to assist with engagement of the spring and damping assembly 7 against the stops 10.

As seen in FIG. 16, the pairs of unitary spring and damping members 31 are sized so as to frictionally engage with the inside of the casing 2. By this configuration, both the damping and positional restorative functions of the connector 1 may be provided without requiring separate spring members 11 to the damping members 12. The connector of FIG. 16 may exhibit the same staged spring and damping characteristic as previously described with relation to FIG. 9. Each opposed pair of coned-disc springs 31 will act as an individual stage.

While it has previously been described that either separate spring members 11 and damping members 12 may be provided, or alternatively a combined damping and spring member 31 may be provided in its place, in some embodiments the spring members 11 of the former configuration may still be sized for at least some frictional engagement with the inside of the casing 2. If the entirety or a substantial portion of the spring and damping assembly is in frictional engagement with the casing, the damping effect may be increased.

Furthermore, where a combined spring and damping member 31 is provided by a Belleville washer or other spring component which expands laterally under compression, the frictional engagement with the casing may be furthermore increased. For example in the case of a Belleville washer, it may expand radially as it is compressed, increasing its frictional engagement with the casing.

Figure 15:
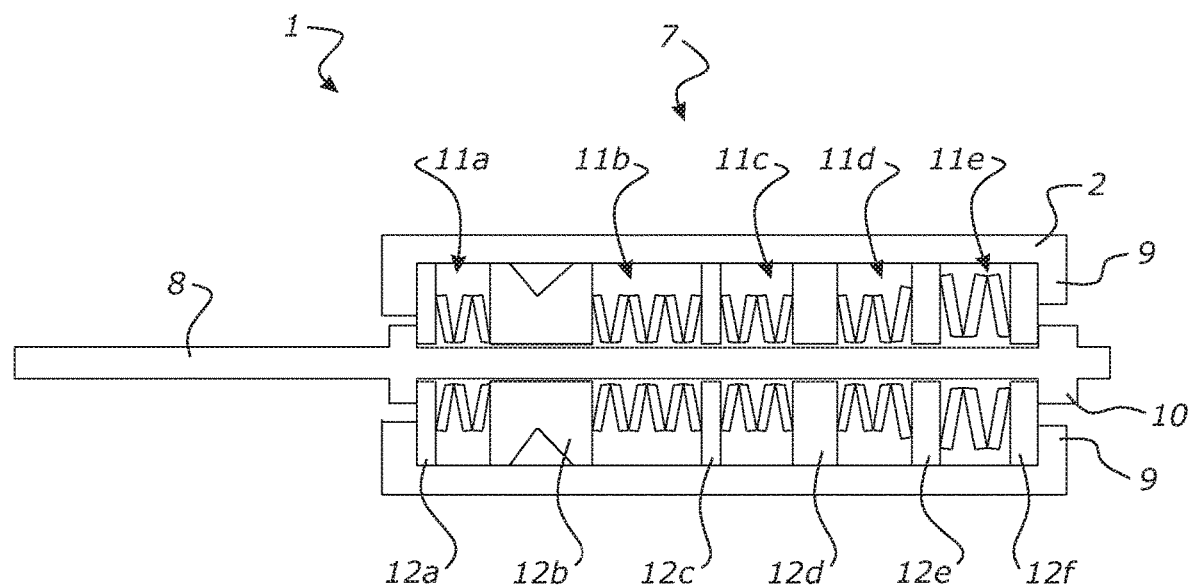
FIG. 15 shows an embodiment of a connector.

While previously described spring and damping assemblies have comprised a plurality of substantially identical spring and damping stages 13, the spring and damping assembly of the connector may comprise of differently configured spring and damping stages 13. For example in the configuration of FIG. 15, the connector 1 comprises a plurality of different spring and damping stages 13. As shown, the damping members 12A-12F may comprise varying thicknesses and/or surface configurations in order to provide different damping characteristics. Similarly, the spring members 11A-11E of each spring and damping stage may comprise of a varying number of spring members 11, spring members of varying spring constants and other characteristics, spring members of different spring types, or spring members of larger and smaller diameters.

The sizing and configuration of each of the spring members 11 and damping members 12, and the location of each of those spring and damping members within the spring and damping assembly 7, may be customised to provide for desired resistance, damping, and restorative force characteristics over different segments of displacement of the connector. The damping members are preferably of a shape and configuration to prevent their yielding during displacement especially plastic yielding.

The spring members 11 or combined damping and spring members 31 may comprise many forms of spring, such as but not limited to Belleville springs, Belleville washers, coned disc springs, conical spring washers, disc springs, cupped spring washers, or other spring washers of a generally frustoconical form. The spring members 11 or damping and spring members 31 may comprise conventional coil springs, die springs, shape memory alloy springs, metal, rubber and composite base springs, or rubber bearings. Each of these may be used singularly, or in a stack. Where Belleville washers are used, they may be stacked in the same or preferably in alternating directions. They should be selected to yield elastically during operation. In the preferred form the spring or springs act in compression.

In some embodiments the damping members 12 may comprise disc-like members. However, the damping members 12 may be of many desired cross-sections so as to substantially correspond with the internal cross-sectional shape and/or area of the casing 2 and may be of different thicknesses and having different surface characteristics. The damping members 12 may be of metallic or composite based materials.

Lubrication can be used between friction surfaces of the connector in order to achieve the desired and predictable damping performance. In addition to providing a lubricant between the friction surfaces of the connector, the use of self-lubricating materials is also contemplated.

While in preferred embodiments the damping members 12 may be located at either end of a spring and damping assembly, in other embodiments a spring and damping member 12 may not be located on at least one or both ends of the spring and damping assembly. Where a damping member 12 is not located at an end, a spring member 11 may be located at that end of the assembly.

In such a configuration, the operational characteristics of the connector may be varied. In such a configuration relative movement of the connector due to a compression at that end of the connector will result without first overcoming any frictional engagement of a damping member 12. Thus, compression of the associated spring and damping assembly and relative movement of the connector will occur upon the external force reaching the pre-stressing value, if any, of the spring member 11.

The casing 2 of the connector preferably comprises at least one elongate split 3. As seen in the connector of FIG. 1A, the elongate split 3 comprises a complete split along the entire length of the casing 2. In other configurations, the split of the casing may be a partial split plane. Whether partial or complete, the configuration of the split should be such as to allow adjustment of the bias of the casing against the spring and damping assembly to control the frictional engagement of the damping assembly 7 with the inside of the casing 2.

As previously described in relation to the connector of FIG. 1A the adjustable member 4 of the casing may be provided by a clamping of the casing along at least a portion of the at least one elongate split 3. The clamping configuration shown in FIG. 1A in relation to the embodiment of FIG. 1A utilises a bolt and nut configuration to clamp the casing at its elongate split 3. While such a bolt and nut configuration may be useful in some applications, particularly for ease of adjustment for pre and post-installation loading of the casing, many other known means of providing a bias at the elongate split may be utilised. For example, many other forms of clamp may be utilised, such as a hose clamp.

Where a bolt and nut configuration are utilized, it may comprise washers in combination with the bolts and nuts. In particular, the washers may be provided in the form of disc springs or Belleville washers. By this configuration the bolted connection may become spring-loaded.

This may be desirable particularly where the adjustable member 4 is provided by clamping at discrete locations along the length of the casing 2. In such a configuration the frictional engagement with the spring and damping assembly 7 may vary within the casing dependent on the distance to the next adjacent clamping point. This may for example be due to deformation of the casing 2.

In such a situation, the presence of disc springs at the bolted connections providing the clamping points may compensate for these variations in the frictional engagement. This compensation may be provided by the compression of the disc springs and consequent reduction in the frictional engagement of the casing 2 with the spring and damping assembly 7 when the spring and damping assembly or the individual damping member is proximate to the clamping point.

While in the preferred form the clamping is substantially continuous along the at least a portion of the elongate split so as to provide a substantially continuous frictional engagement of the casing 2 with a damping member 12, the adjustment of the bias 4 along the split 3 may be varied along the elongate direction of the casing 2 in order to provide variable damping characteristics.

For example, in the connector of FIGS. 3 and 4, relatively greater clamping force towards an end of the spring and damping assembly 7 may provide for increased damping at the start of the displacement of the connector, relative to later stages of displacement. Conversely, if provided at the other end of the spring and damping assembly or under the other of tension or compression of the connector, it may provide for increased damping at the later stages of the displacement of the connector relative to the earlier stages of displacement.

Corresponding effects may also be provided by relative increases or decreases in clamping forces at other particular points along a spring and damping assembly 7.

While shown in the embodiment as shown in FIG. 1A as comprising a substantially circular elongate body having a single elongate split 3, the casing 2 of the connector may comprise more than one elongate split plane. The casing may hence be made from more than one component to define the internal cross section.

Examples of such configurations are shown in FIGS. 5B & 5C. In these configurations the adjustable member 4 will preferably be provided at each of the elongate splits 3 in order to allow for adjustment of the cross-sectional shape or area of the casing 2.

While the casing 2 may comprise a body having a substantially circular internal cross-section, any other desired cross-section may be provided within the scope of the invention. For example, FIGS. 6A-6C show a casing 2 comprising a substantially square internal cross-section. FIGS. 7A-7C show a casing having a substantially triangular internal cross-section. FIGS. 8A-8E show a casing 2 comprising a substantially pentagonal internal cross-section. As also seen in FIGS. 6A-8E the casing 2 may comprise one or more elongate splits 3, and where multiple elongate splits are provided they may be either symmetric or non-symmetrically arranged about the perimeter of the casing.

The internal surfaces of the casing do not need to be of the same shape along the spring and damping assembly. As long as for the range of travel of a damper member the cross sectional shape is constant and does not taper then a constant frictional force will exist between the casing and a damper member.

So for example the first and second damper members 12a and 12d and the interior surfaces of the casing those members slide along may be of a larger diameter than the intermediate damper members 12b and 12c and their respective internal surfaces they slide along.

However, in a preferred form the interior surface or surfaces define a constant cross section for sliding engagement along the entire of the spring and damping assembly.

The frictional engagement of the spring and damping assembly 7 with at least part of the inside of the casing 2 during relative displacement of the connected first and second structural members of the structure provides damping of the external force causing relative displacement. The damping provided by the connector 1 may act to dissipate the energy of the external force, and reduce the external force loads applied to the structural members of the structure.

The connector of the present invention may be configured to provide for high initial stiffness due to the frictional engagement of the spring and damping assembly with the casing. This means that high thresholds of external force can be required in order to result in slipping and displacement of the connector. This high initial stiffness can limit the drift of the structure under serviceability loads, and mean the connector only allows relative displacement under large external forces, such as those experienced during a seismic event.

Because the connector 1 operates with limited and preferably no plastic deformation of its frictional components or its other components, the connector may require limited or preferably no servicing between external forcing events. The reduction or elimination of the need for servicing of the connector following an external forcing event may significantly reduce the ongoing operational costs associated with the structure.

The positional restoring capacity or function of the connector may also provide for reduced servicing requirements of the structure, and improved performance of the structure, as the structural members are able to be returned to or towards its initial position after an external forcing event, with limited and preferably no residual displacement remaining between the structural members.

The connector of the present invention provides a customisable structural connector. For a given connector with a particular spring and damping assembly having set spring characteristics, the overall damping capacity, including the initial slipping threshold and ultimate resistance force of the connector, may simply be varied by the adjustment of the adjustable member 4 of the casing 2. Similarly, the threshold of external force below which the connector 1 will begin to restore residual displacement of the connector and the residual spring force in the connector at zero displacement may be adjusted by varying the precompression of the spring and damping assembly between the stops 10 of the rod 8 and/or bearing members 9. In this manner, a connector may be customised to provide particular damping and restoration characteristics.

While the bearing members 9 have previously been described as elements fixed in relation to the casing 2, in order to provide for further customisation of the characteristics of a connector 1 the bearing members 9 may be adjustable along the elongate direction of the casing 2. For example, the bearing members 9 may be able to be adjustably fixed at particular increments along the elongate direction of the casing. Alternatively, the bearing members 9 or at least one of the bearing members 9 may be threadingly engaged with the inside of the casing 2. The adjustment of the position of the bearing members 9 along the elongate direction of the casing allows for an adjustment of the maximum stroke length and thus maximum relative displacement of the connected structural members.

In addition to the previously described adjustments of a given connector in order to provide different initial and ultimate stiffness, damping, and restoration characteristics, the connector of the present invention may be scaled to different sizes in order to resist different loads.

Having described the functionality and operation of a connector 1 according to primary embodiments of the invention, further alternate configurations and combinations of connectors according to the invention will now be described.

Figure 19:
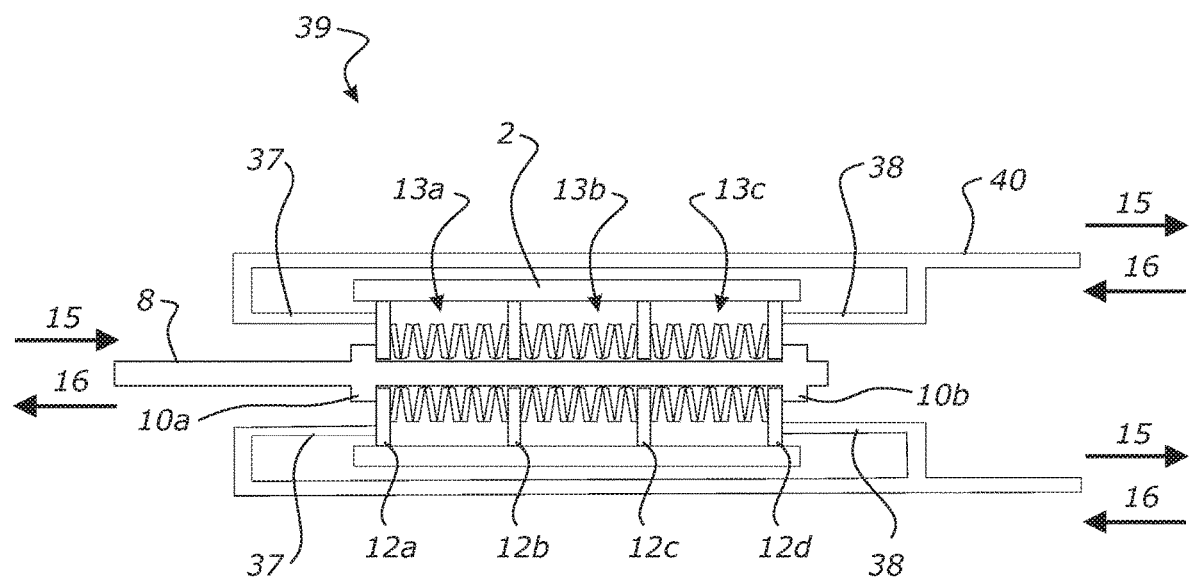
FIG. 19 shows an embodiment of a connector.

FIG. 19 shows a further embodiment of the connector of the present invention wherein under the action of the connector under either tension or compression the spring and damping assembly 7 is simultaneously compressed from both ends.

In FIG. 19 the connector 39 comprises a rod 8 for connection to a first structural member, and a sleeve 40 for connection to the second structural member. Provided about the rod and between stops 10 of the rod as previously described is a multistage spring and damping assembly 7. The spring and damping assembly 7 is provided within a casing 2 that may comprise of an elongate split 3 and an adjustable member for the internal cross section, also as previously described.

In the connector 39 the sleeve 40 is provided about the casing 2, and the sleeve 40 is for connection to the second structural member of the structure. In the configuration of FIG. 19, the casing 2 does not need to comprise any bearing members 9. In place of the previously described bearing members 9, the sleeve 40 comprises at least one bearing elements 37 or 38 to act on a first damping member 12A. In a double-acting configuration at least one bearing element 37 at one end of the spring and damping assembly 7, and at least one bearing element 38 to act on a damping member 12D at the opposite end of the spring and damping assembly.

In the configuration of FIG. 19, the connector 39 effectively isolates the casing 2 and spring and damping assembly 7 from relative displacement of the rod 8 and sleeve 40.

Exposure of the connector 39 to tension results in displacement of the rod 8 in the direction of the arrows 16, and the sleeve 40 in the direction of the arrow 15. At the first end of the casing the bearing elements 37 act on the damping member 12A and once the frictional threshold with the casing 2 is met, and result in the compression of the first spring and damping stage 13A. Simultaneously at the opposite end of the spring and damping assembly the stop 10B of the rod 8 acts on the damping member 12D and once its frictional engagement threshold with the casing 2 is met results in the compression of the spring and damping stage 13C. Further displacement of the rod and sleeve 40 in tension will result in slipping of the damping members 12B and 12C, and in compression of the spring and damping stage 13B.

Under the exposure of the connector 39 to compression the rod 8 is moved in the direction of the arrow 15, and the sleeve 40 is moved in the direction of the arrows 16. At the first end of the spring and damping assembly the stop 10A of the rod bears against the damping member 12A, and results in compression of the spring and damping stage 13A. At the opposite end of the spring and damping assembly the bearing element 38 of the sleeve 40 act on damping member 12D and cause the compression of the spring and damping stage 13C.

The connector assembly 39 of FIG. 19 provide a double acting configuration, wherein under both exposure of the connector to tension and exposure of the connector to compression the spring and damping assembly 7 are able to be acted on simultaneously at each end. The result is that the spring and damping stages of each spring and damping assembly may simultaneously compressed from the outside to the inside of the spring and damping assembly.

Figure 17A:
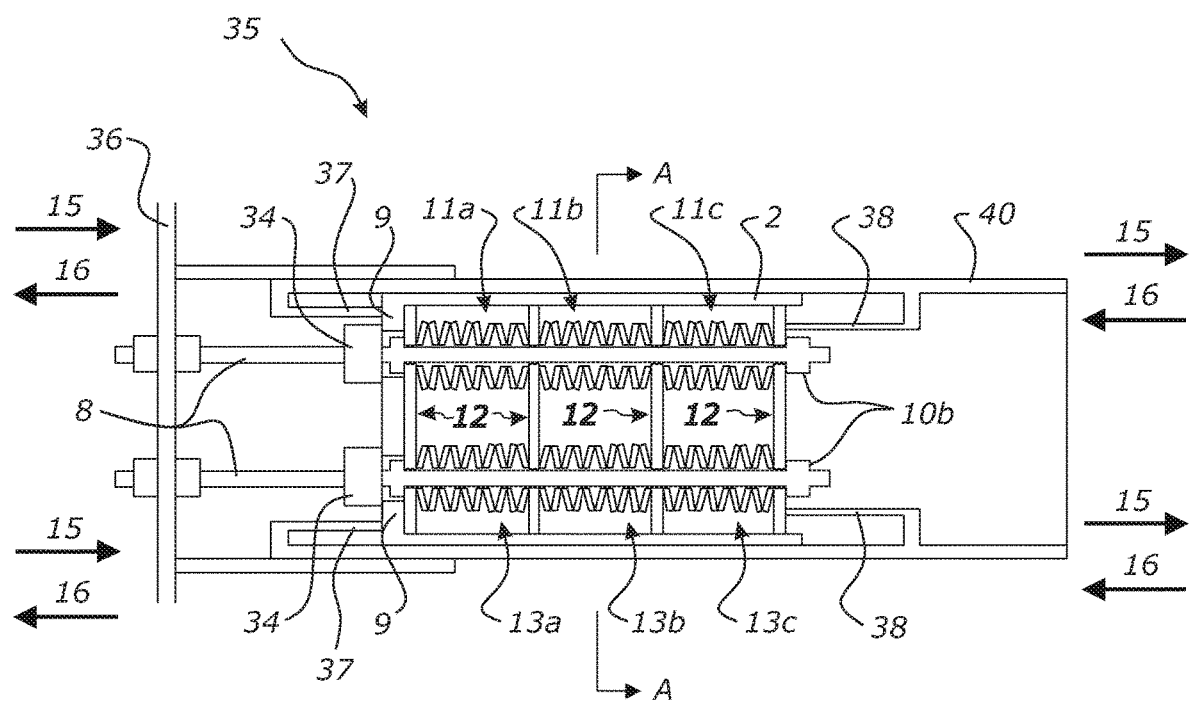
FIG. 17A shows a cut-away view of a combination connector according to an embodiment of the invention.

A further combination configuration of a connector according to the present invention is shown in FIGS. 17A. This combination configuration utilises the sleeve 40 and bearing elements 37 and 38 as previously described in relation to FIG. 19.

Figure 17B:
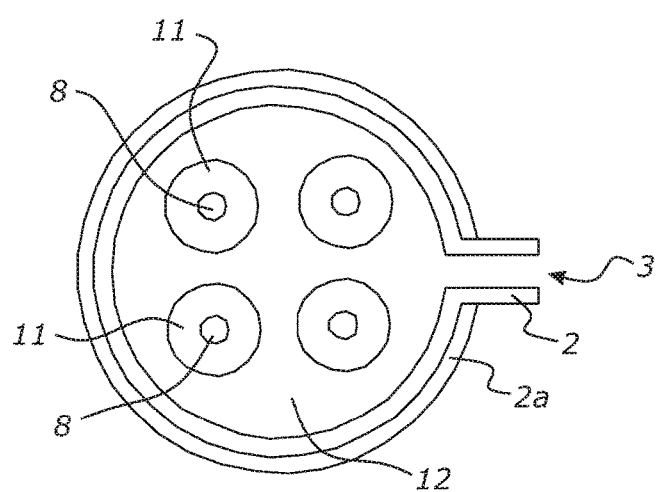
FIG. 17B shows a cross-section through the lines AA of FIG. 17A.

FIG. 17A shows a cross-section along the longitudinal or elongate direction of the connector assembly 35, and FIG. 17B shows a cross-section through the line AA of FIG. 17A.

Seen in the view of FIG. 17B, the connector assembly 35 comprises a casing 2 having an elongate split 3. Provided within the casing 2 are four rods 8, each having arrays of spring members 11 provided about them. Provided about the four rods 8, and sized so as to substantially correspond with the internal cross-sectional shape or area of the casing 2, are damping members 12.

While not shown in FIG. 17B, an adjustable member 4 is to be provided along the elongate split 3 of the casing 2 so as to apply a force to the casing for setting and varying the sliding frictional engagement with the damping members 12.

As in the configuration of FIG. 19, a sleeve 40 is provided about the casing 2, for connection to the second structural member. The four rods 8 are connected together, such as by a connector plate 36, which is then able to be connected to the first structural member of the structure.

Under exposure of the connector assembly 35 to a tensile external force the connector assembly 35 operates substantially as previously described in relation to the embodiment of FIG. 19. The connector plate 36 and rods 8 are forced in the direction of the arrows 16, and the sleeve 40 is forced in the direction of the arrows 15. The stops 10B of the rods 8 each act against the adjacent damping member 12 of each rod. Simultaneously, the bearing elements 37 of the sleeve 40 act against the opposite end of the casing 2.

Once the required threshold of force has been met, this can result in slipping of the damping members 12 adjacent the stops 10B relative to the casing 2 and compression of the stage 13c of the spring and damping assembly 7. Subsequent stages are compressed upon further increases in the external force and further displacement of the connector.

The operation of the connector assembly 35 in compression comprises a forcing of the connector plate 36 and rods 8 in the direction of the arrows 15, and a forcing of the sleeve 40 in the direction of the arrows 16. Under this action, the secondary stop 34 of each rod bears against the adjacent bearing member 9 of the casing, and consequently against the adjacent damping member 12.

At the opposite end of the spring and damping assemblies 7 the bearing element 38 of the sleeve 40 acts on the adjacent damping member 12 to cause its sliding relative the casing 2, and the compression of its associated spring and damping stage.

The action of the secondary stops 34 against the casing 2 will result in relative displacement of the casing 2 with respect to the sleeve 40 under action of the connector assembly 35 in compression.

Figure 18:
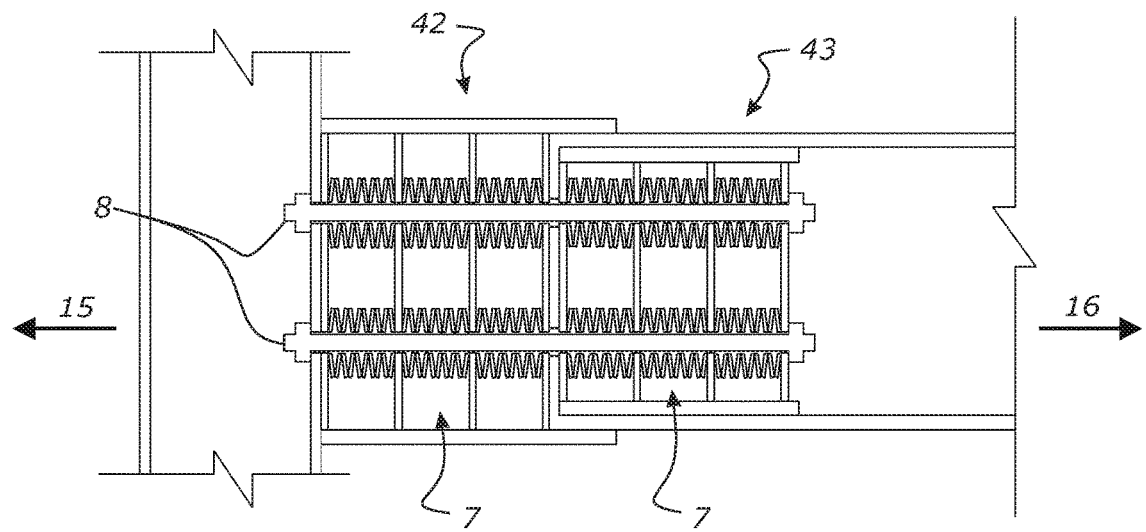
FIG. 18 shows a combination configuration of a connector according to an embodiment of the invention.

FIG. 18 shows a further variation of the connector. The connector 41 comprises a first section 42 which is able to slide relative to the second section 43. Within each section is a spring and damping assembly 7, with rods 8 running through them. The first section and second section are each connected to a structural member. Under relative displacement of the first section in the direction of the arrow 15 and the second section in the direction of the arrow 16, only the spring and damping assembly of the second section 43 is elastically deformed. Similarly, under the reverse displacement of each section, only the spring and damping assembly 7 of the first section 42 is elastically deformed. Such a configuration may be desirable to provide for action of the connector under both relative displacements, but to allow customization of the way the connector acts in each direction. For example, the spring force or maximum travel of the spring and damping assembly or the frictional engagement of the casing may be individually set on each section 42, 43.

Figure 20:
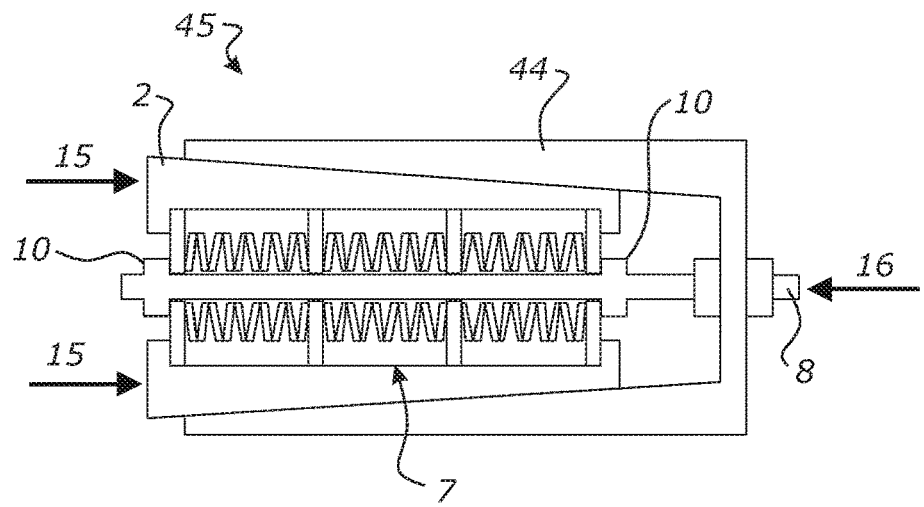
FIGS. 20-22 show embodiments of a connector which is able under certain conditions of varying the frictional engagement of the elongate spring and damping assembly along the displacement of the connector.

FIG. 20 shows a further variation of the connector of the present invention. The connector 45 comprises a casing 2, rod 8 and spring and damping assembly 7 substantially as previously described in relation to the connector 1 of FIGS. 3 and 4.

The casing 2 however comprises a ramped or sloped external surface, to correspond with a ramped or sloped surface of an external casing 44 provided about at least part of the casing 2. The interaction of the external casing 44 with the casing 2 is such as to provide a relative position dependent bias of the casing 2. This relative position dependent bias may be provided in place of, or in addition to the previously described adjustable member 4.

The rod 8 is fixed to the external casing 44, and the two are in turn connected to the second structural member. The casing 2 is connected to the second structural member.

Under relative displacement of the casing 2 and the external casing 44, the casing 2 may preferably be caused to ramp along the mutually ramped surfaces so as to vary the bias of the casing 2 and vary the frictional engagement of the casing 2 with the spring and damping assembly 7.

For example, as seen in FIG. 20, casing 2 and external casing 44 comprise a single mutual ramped surface above and below. The direction of the mutually ramped surfaces is such that the casing 2 may be forced into increased frictional engagement with the spring and damping assembly 7 under a displacement of the casing 2 in the direction of arrow 15 and the external casing 44 in the direction of arrow 16.

Figure 21:
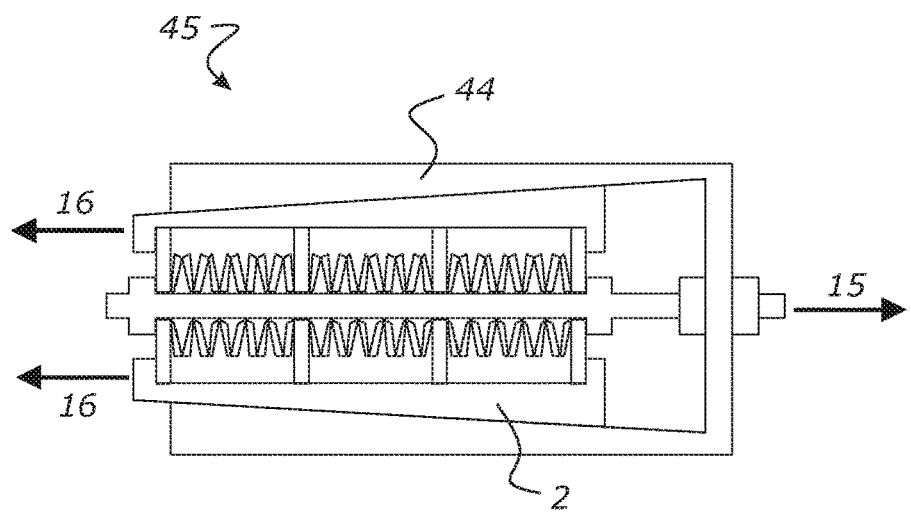

The reverse configuration is shown in FIG. 21, wherein the ramped surfaces are configured such that a displacement of the casing 2 in the direction of arrow 16 and the external casing 44 in the direction of arrow 15 is such as to increase the frictional engagement with the spring and damping assembly 7. The angle of the ramped surfaces is exaggerated for illustrative purposes.

Figure 22:
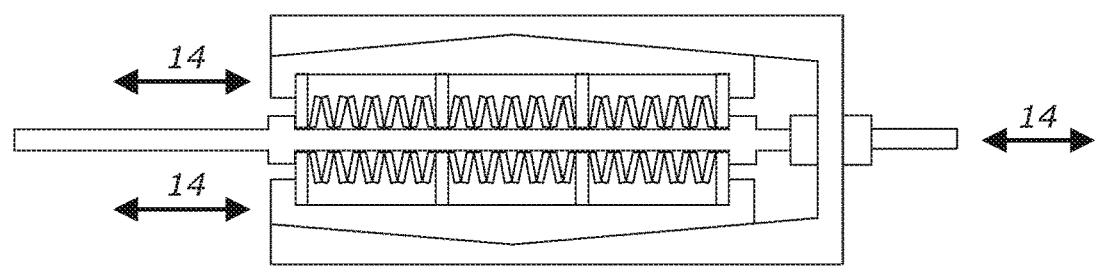

FIG. 22 shows in effect a combination the connectors of FIGS. 20 and 21. In FIG. 22 the connector 46 has a casing 47 and external casing 48 which each comprise a pair of mutually ramped surfaces. The effect of the configuration of FIG. 22 is that the casing 47 may be compressed and urged into increased frictional engagement with the spring and damping assembly 7 under relative displacement of the casing 47 and external casing 48 in either direction.

The configurations of FIGS. 20-22 will provide, under their ramping conditions, for increased damping properties of the connector as the relative displacement of the first and second structural members from an initial position increase. This will provide increased resistance to relative displacement, and may act as an effective limit of the relative displacement.

Figure 23:
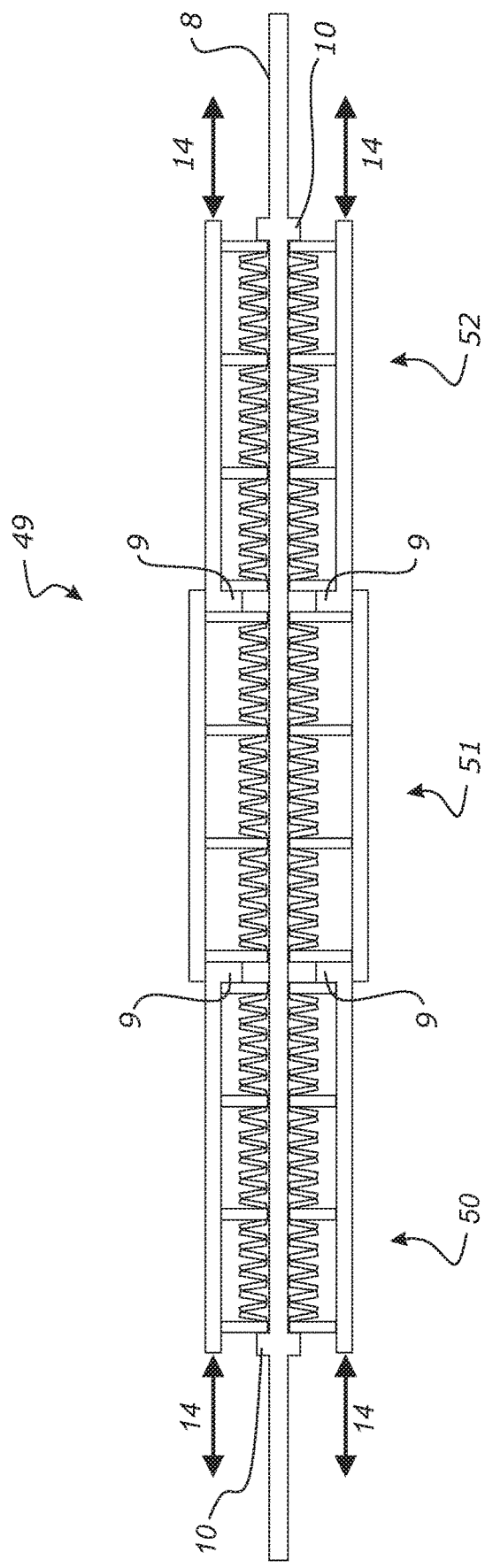
FIG. 23 shows a combination configuration of a connector according to the invention.

The connector 49 combination of FIG. 23 is similar to that described in relation to FIG. 18. In FIG. 23, the connector 49 comprises three portions 50, 51, and 52, each having its own spring and damping assembly 7. The casings of the outer portions are each able to slide within the inner portion. In this configuration the outer casings 50 and 52 are each for connection to a respective first or second structural member.

Under an exposure of the connector 49 to tension, the bearing members 9 of the outer casings act in combination with the stops 10 to compress the spring and damping assemblies of the outer portions 50, 52.

Under an exposure of the connector 49 to compression, the stops 10 of the rod 8 at each end of the connector 49 act against their spring and damping assemblies, and cause the compression of the first stages of the spring and damping assemblies. Once the outer portions 50, 52 are fully compressed, the bearing members 9 of each outer portion acts against an end of the middle portion 51, and its spring and damping assembly is compressed from each end.

By this configuration a connector 49 can be provided having different total maximum displacements of the first and second structural members in the operation of the connector in tension rather than in compression.

In some embodiments a secondary fuse may be associated with the elongate casing 2, and in sliding frictional engagement with the elongate casing. For example, the secondary fuse may be provided about the elongate casing 2. Alternatively, the secondary fuse may be provided within the elongate casing 2, intermediate of the casing and the spring and damping assembly. In such a configuration the elongate casing indirectly acts on the spring and damping assembly, through the secondary fuse.

The sliding frictional engagement between secondary fuse and the elongate casing is to always be greater than the resistive value of the spring and damping assembly 7 during its compression.

The purpose of the secondary fuse is to provide for further damped relative movement of the connector past the full compression of the spring and damping assembly 7. In a preferred form the fuse will act only under loading conditions greater than the design expectations of the connector.

Figure 25A:
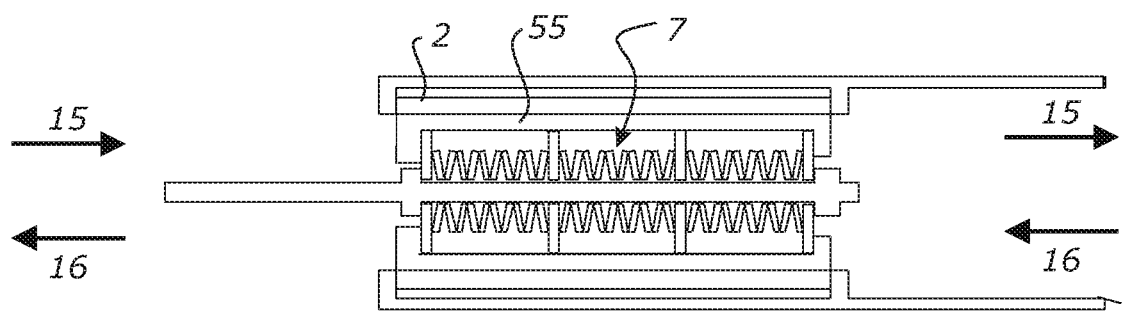
FIGS. 25A-C show various views of an embodiment of a connector.
Figure 25B:
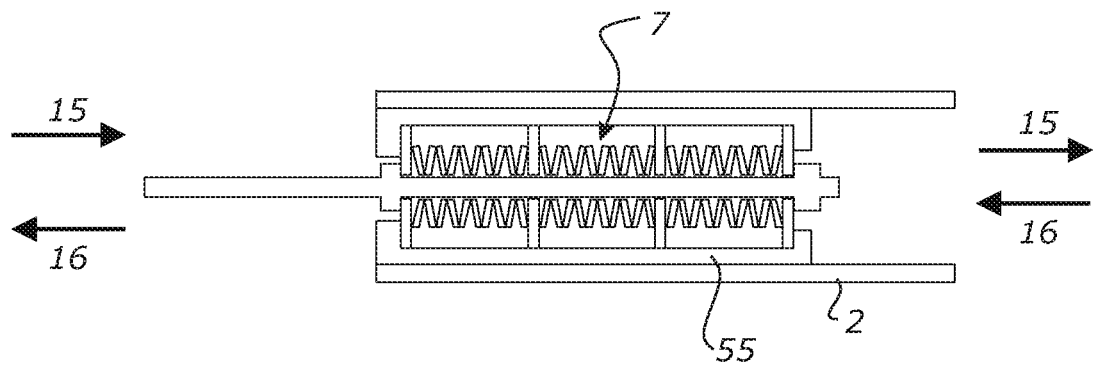

Two potential embodiments of a connector comprising a secondary fuse 55 are shown in FIG. 25A and FIG. 25B. The other parts of the connector are substantially as have been previously described. Upon the full compression of the spring and damping assembly 7, the casing 2 and secondary fuse 55 are able to slide relative to each other. Such a relative sliding provides further damping, but upon the reduction or ceasing of the external force, will mean that the components of the connector and the associated structural components will not be fully returned to their initial relative positions.

Figure 25C:
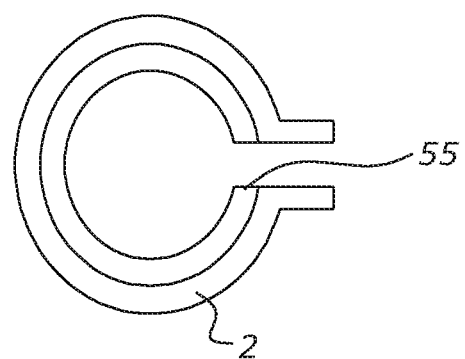

FIG. 25C shows an end-on view of a casing 2 and secondary fuse 55 of FIG. 25A or FIG. 25B. As seen in FIG. 25C, the secondary fuse 55 is provided within the casing 2 and intermediate of the casing and its spring and damping assembly (not shown). In such a configuration the clamping of the casing will provide or control the frictional engagement with the spring and damping assembly, but the casing 2 is not in direct frictional engagement with the casing. Rather, the secondary fuse 55 is in direct frictional engagement with the casing.

The configuration of the secondary fuse described above is analogous to the sleeve 40 described in relation to previous embodiments, if the sleeve 40 was able to slide relative to the casing 2 and frictionally engaged with the casing 2 to a greater degree than the maximum resistance of the spring and damping assembly 7 during its compression.

FIGS. 24A-D show various potential applications of the connector or of combinations of connectors according to the invention in a structure 53.

In FIG. 24A the structure 53 is a bracing frame, and connectors 54 according to the invention are located between parts of the bracing frame.

In FIG. 24B the structure 53 is a moment resisting frame, and connectors 54 are provided within it allow resisted moment action, and to return the moment resisting frame to its initial position following the external event.

The structure of FIG. 24C is a shear wall, and connectors 54 are provided to allow resisted shear movement between the parts of the structure, but to dampen such movements and return the hear wall to its initial position following the external forcing event. FIG. 24C may also illustrate the use of connectors to hold down storage tanks. As seen the rod is connected to the foundation 401 and the casing to the tank 400.

Finally, FIG. 24D shows the use of connectors 54 of the present invention in structure 53 as buckling-resistant bracing members.

The slip friction damped connector is not a viscous or hydraulic damper. Working fluids are not used to provide damping. This means the damping and resistance forces are independent of velocity of displacement and of temperature.

Where in the foregoing description reference has been made to elements or integers having known equivalents, then such equivalents are included as if they were individually set forth.

Although the invention has been described by way of example and with reference to particular embodiments, it is to be understood that modifications and/or improvements may be made without departing from the scope or spirit of the invention.

The invention claimed is:

1. A resilient slip friction connector for connecting to and allowing displacement between a first structural member and second structural member of a building structure the connector comprising:
   - an elongate hollow casing configured for connection to the second structural member,
   - an elongate spring and damping assembly having two opposite ends, the spring and damper assembly configured to slide inside the casing in frictional engagement with the casing,
   - a rod provided within the casing and connected to the elongate spring and damping assembly, wherein the rod and the elongate spring and damping assembly move together, and wherein the rod is configured for connection to the first structural member,
   - at least one bearing element for bearing against one end of the spring and damping assembly, wherein the at least one bearing element is fixed relative to the casing at one end of the elongate spring and damping assembly only,
   - wherein the spring and damping assembly is able to be elastically deformed by its compression between one of its ends and the at least one bearing element due to a relative linear displacement of the rod and casing, and is configured such that a bias force caused by the compression of the spring and damping assembly exceeds the frictional force between the spring and damping assembly and the casing,
   - wherein the connector has an initial position of the rod and the casing in which the elastic deformation of the spring and damper assembly is minimised,
   - and wherein the connector is configured to allow relative displacement of the casing and the rod from the initial position in only one of a first direction, corresponding to a tension force on the connector, or an opposite second direction, corresponding to a compression force on the connector, and
   - wherein the hollow casing comprises at least one elongate split allowing the casing to expand and contract its internal cross-sectional shape or area, and wherein an adjustable member is provided for applying a force to the casing for setting and varying the sliding frictional engagement between the spring and damping assembly and the casing.

2. The connector as claimed in claim 1, configured such that upon a ceasing of an external force on the connector which causes deformation of the spring and damping assembly, the first and second structural members are caused to return under the bias of the spring and damping assembly to their initial position.

3. The connector as claimed in claim 2, wherein the reduction of the external force comprises a reduction below a first threshold.

4. The connector as claimed in claim 1, wherein the at least one bearing element is integral with the casing.

5. The connector as claimed in claim 1, wherein the adjustable member acts at least in part as a bias towards a predetermined degree of frictional engagement between the casing and the spring and damper assembly.

6. The connector as claimed in claim 1, wherein the elongate spring and damping assembly comprises a plurality of Belville washers.

* * * * *